(12) United States Patent
Kim

(10) Patent No.: US 12,132,998 B2
(45) Date of Patent: Oct. 29, 2024

(54) ELECTRONIC DEVICE AND METHOD OF OPERATING THE SAME

(71) Applicant: SK hynix Inc., Icheon-si Gyeonggi-do (KR)

(72) Inventor: Dong Ik Kim, Icheon-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 323 days.

(21) Appl. No.: 17/686,084

(22) Filed: Mar. 3, 2022

(65) Prior Publication Data

US 2023/0064910 A1  Mar. 2, 2023

(30) Foreign Application Priority Data

Aug. 30, 2021  (KR) .......................... 10-2021-0115123

(51) Int. Cl.
*H04N 23/73* (2023.01)
*H04N 23/68* (2023.01)
*H04N 23/72* (2023.01)

(52) U.S. Cl.
CPC ......... *H04N 23/73* (2023.01); *H04N 23/6811* (2023.01); *H04N 23/72* (2023.01)

(58) Field of Classification Search
CPC .... H04N 23/73; H04N 23/6811; H04N 23/72; H04N 23/683; H04N 23/741
See application file for complete search history.

(56) References Cited

U.S. PATENT DOCUMENTS

| | | | | |
|---|---|---|---|---|
| 8,305,500 | B2 * | 11/2012 | Cheng ................... | H04N 19/43 375/240.26 |
| 2005/0232514 | A1 * | 10/2005 | Chen ...................... | G06T 7/215 382/302 |
| 2008/0247465 | A1 * | 10/2008 | Xin ....................... | H04N 19/513 375/E7.122 |
| 2010/0271512 | A1 * | 10/2010 | Garten ................... | H04N 5/232 382/284 |
| 2012/0033131 | A1 * | 2/2012 | Chen ..................... | H04N 23/741 348/E7.003 |

(Continued)

FOREIGN PATENT DOCUMENTS

| | | |
|---|---|---|
| KR | 101699919 B1 | 1/2017 |
| KR | 1020190077680 A | 7/2019 |

OTHER PUBLICATIONS

Samuel W. Hasinoff et al., "Burst photography for high dynamic range and low-light imaging on mobile cameras", ACM Transactions on Graphics, vol. 35, Issue 6, Nov. 2016, Article No. 192, pp. 1-12, Macao.

*Primary Examiner* — Abdelaaziz Tissire
(74) *Attorney, Agent, or Firm* — WILLIAM PARK & ASSOCIATES LTD.

(57) ABSTRACT

An electronic device according to the present technology may include an image sensor including a plurality of pixel groups respectively corresponding to a plurality of exposure values, and a controller configured to select a reference scale image having a minimum exposure value and a target scale image having an exposure value different from the minimum exposure value, among a plurality of scale images that are obtained based on the plurality of pixel groups, and output an output image obtained using a motion map indicating a positional change of an object that is commonly included in the reference scale image and the target scale image.

18 Claims, 19 Drawing Sheets

$$MV\_XY = \begin{matrix} 0, \\ \dfrac{D\_XY - Min}{Max - Min}, \\ 1, \end{matrix} \begin{matrix} (\text{if } D\_XY \leq Min) \\ (\text{if } Min < D\_XY \leq Max) \\ (\text{if } D\_XY > Max) \end{matrix} \quad (Min < Max)$$

(56) References Cited

U.S. PATENT DOCUMENTS

| | | | | |
|---|---|---|---|---|
| 2012/0194686 | A1* | 8/2012 | Lin | H04N 23/741 |
| | | | | 348/208.4 |
| 2014/0198226 | A1* | 7/2014 | Lee | H04N 23/6811 |
| | | | | 348/208.1 |
| 2015/0348242 | A1* | 12/2015 | Molgaard | G06T 5/73 |
| | | | | 348/241 |
| 2016/0173751 | A1* | 6/2016 | Nakata | H04N 23/741 |
| | | | | 348/362 |
| 2016/0352995 | A1* | 12/2016 | Min | H04N 23/6811 |
| 2019/0199948 | A1* | 6/2019 | Kim | H04N 25/589 |
| 2019/0318460 | A1* | 10/2019 | Bouzaraa | H04N 23/741 |
| 2020/0175660 | A1* | 6/2020 | Iijima | G06T 5/50 |
| 2021/0127053 | A1* | 4/2021 | Sambongi | G06T 5/73 |
| 2021/0360139 | A1* | 11/2021 | McElvain | H04N 25/583 |
| 2022/0301105 | A1* | 9/2022 | Kim | H04N 23/60 |
| 2023/0020674 | A1* | 1/2023 | Kim | H04N 23/81 |
| 2023/0050561 | A1* | 2/2023 | Lee | H04N 9/646 |

* cited by examiner

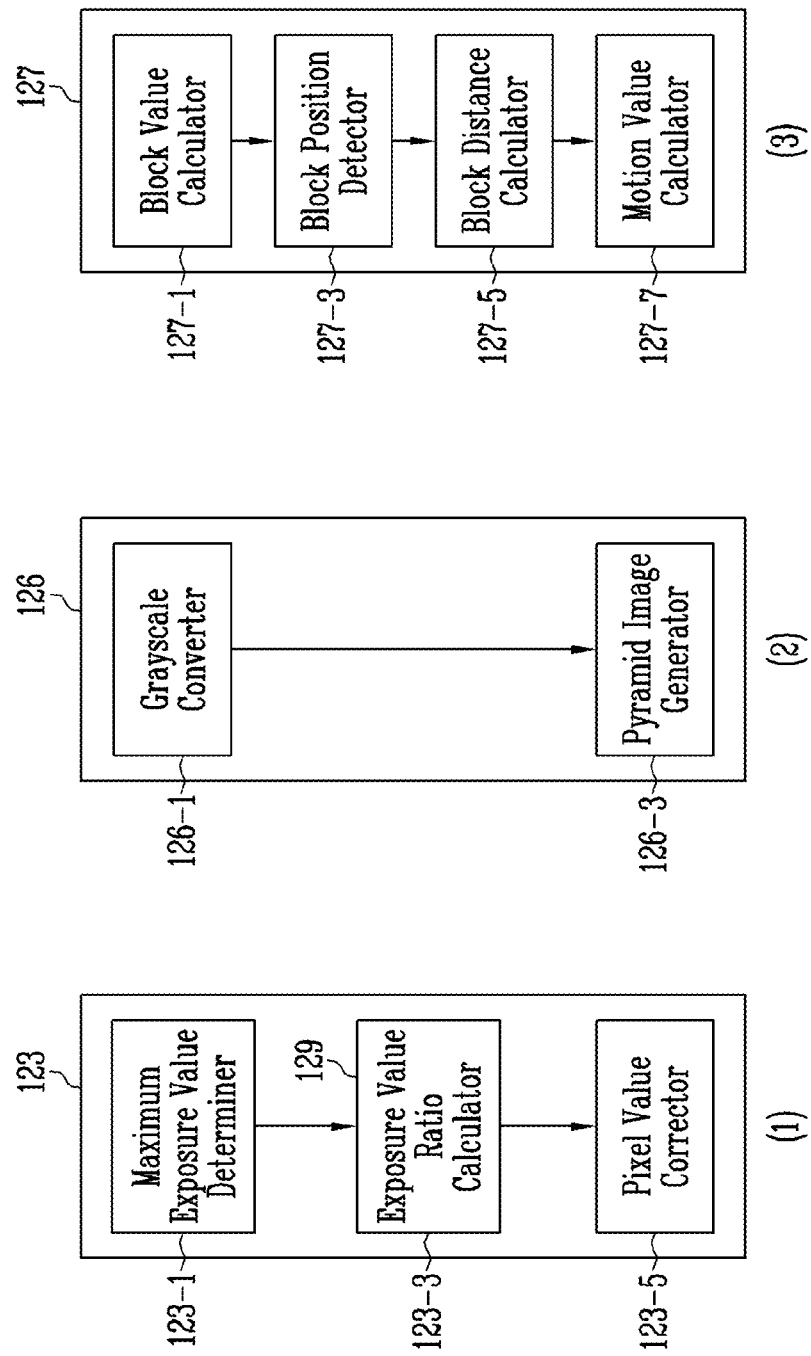

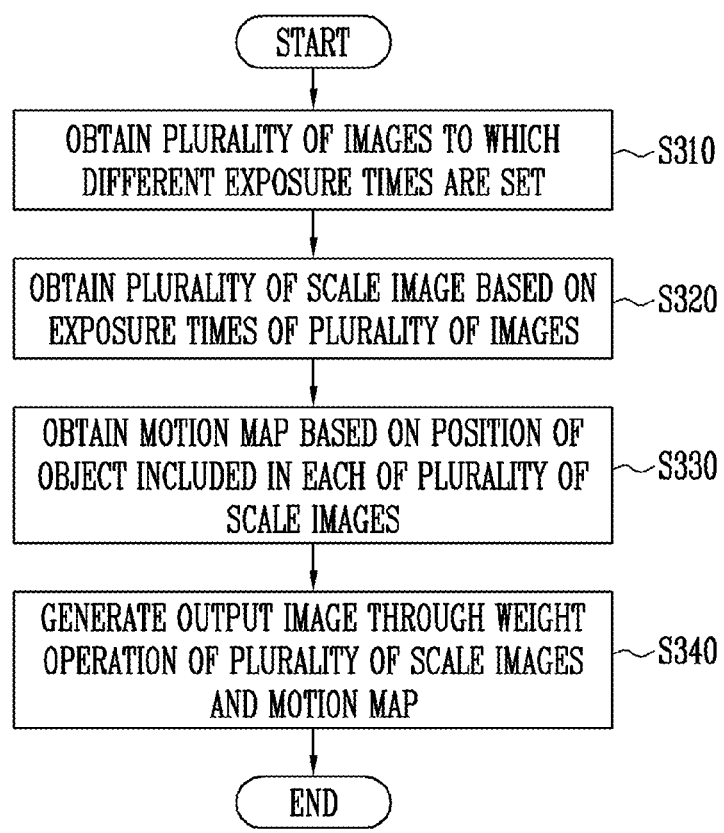

FIG. 7C $$MV\_XY = \begin{matrix} 0, & (\text{if } D\_XY \leq \text{Min}) \\ \frac{D\_XY - \text{Min}}{\text{Max} - \text{Min}}, & (\text{if Min} < D\_XY \leq \text{Max}) \\ 1, & (\text{if } D\_XY > \text{Max}) \end{matrix} \quad (\text{Min} < \text{Max})$$

$$\text{Out\_Img} = \frac{1}{n-1} \times \sum_{i=2}^{n} (\text{SIMG\_1} + (1-\text{Motion\_map}\_i) \times (\text{SIMG}\_i - \text{SIMG\_1}))$$

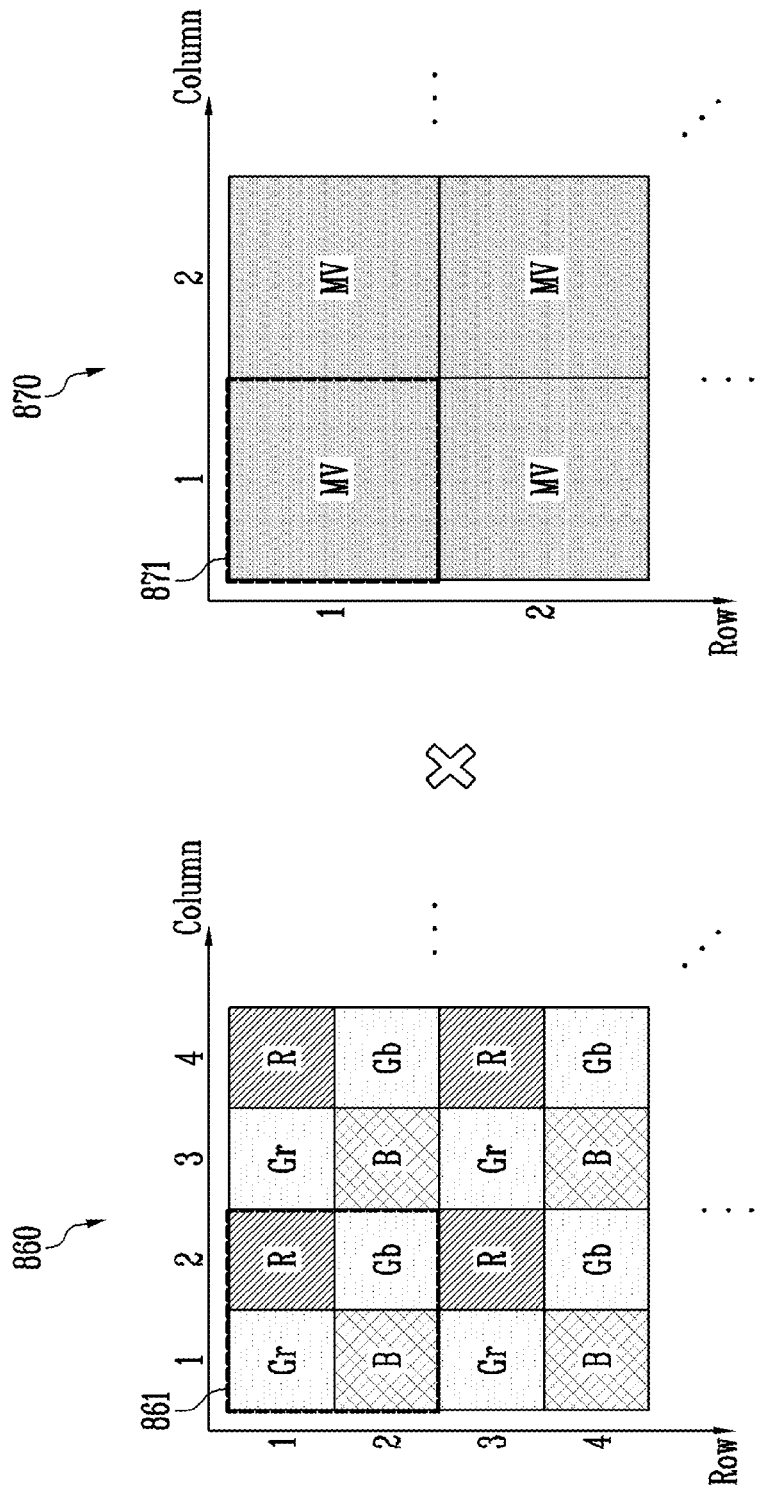

ELECTRONIC DEVICE AND METHOD OF OPERATING THE SAME

CROSS-REFERENCE TO RELATED APPLICATION

The present application claims priority under 35 U.S.C. § 119(a) to Korean patent application number 10-2021-0115123, filed on Aug. 30, 2021, in the Korean Intellectual Property Office, the entire disclosure of which is incorporated herein by reference.

BACKGROUND

1. Technical Field

The present disclosure relates to an electronic device, and more particularly, to an electronic device including an image sensor, and a method of operating the electronic device.

2. Related Art

Recently, with development of a computer industry and a communication industry, demand for an image sensor in various electronic devices such as a smartphone, a digital camera, a game device, Internet of things, a robot, a security camera, a medical camera, and an autonomous vehicle is increasing.

In particular, recently, various techniques for synthesizing multiple original images of which exposure times are different into one image are being studied to improve image quality such as dynamic range (DR). However, when an object or an image sensor itself moves, a position of the object that is included in each of the original images differently appears according to the exposure time. Therefore, there is a problem that the same object is repeatedly displayed at different positions in one synthesis image or a so-called ghost phenomenon in which a movement process of the object is displayed occurs. A technique for solving such a ghost phenomenon is required.

SUMMARY

According to an embodiment of the present disclosure, an electronic device may include an image sensor including a plurality of pixel groups respectively corresponding to a plurality of exposure values, and a controller configured to select a reference scale image having a minimum exposure value and a target scale image having an exposure value different from the minimum exposure value, among a plurality of scale images that are obtained based on the plurality of pixel groups, and output an output image obtained using a motion map indicating a positional change of an object that is commonly included in the reference scale image and the target scale image.

According to an embodiment of the present disclosure, a method of operating an electronic device may include obtaining a plurality of images from a plurality of pixel groups that sense pixel values during different exposure times, obtaining a plurality of scale images that are obtained by correcting the plurality of images by using an exposure time of each of the plurality of images, generating a motion map that indicates a positional change of an object, based on a reference scale image, among the plurality of scale images, having a minimum exposure time and a selection scale image with an exposure time that is different from the minimum exposure time, and outputting an output image that is synthesized by using the motion map as a weight for the reference scale image and the selection scale image.

BRIEF DESCRIPTION OF THE DRAWINGS

FIG. 2C is a diagram illustrating detailed configurations of a scaler, a preprocessor, and a motion map generator according to an embodiment of the present disclosure.

FIG. 3 is a diagram illustrating a method of operating an electronic device according to an embodiment of the present disclosure.

FIGS. 7A to 7C are diagrams illustrating a motion map according to an embodiment of the present disclosure.

FIGS. 8A to 8C are diagrams illustrating an output image according to an embodiment of the present disclosure.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

An embodiment of the present disclosure provides an electronic device and a method of operating the same for outputting an image with improved image quality while preventing a ghost phenomenon from occurring according to a motion of an object.

The present technology may provide an electronic device and a method of operating the same for outputting an image with improved image quality while preventing a ghost phenomenon from occurring. According to the present technology, the occurrence of the ghost phenomenon in an image that is obtained by synthesizing images of which exposure times are different may be minimized.

Figure 1:
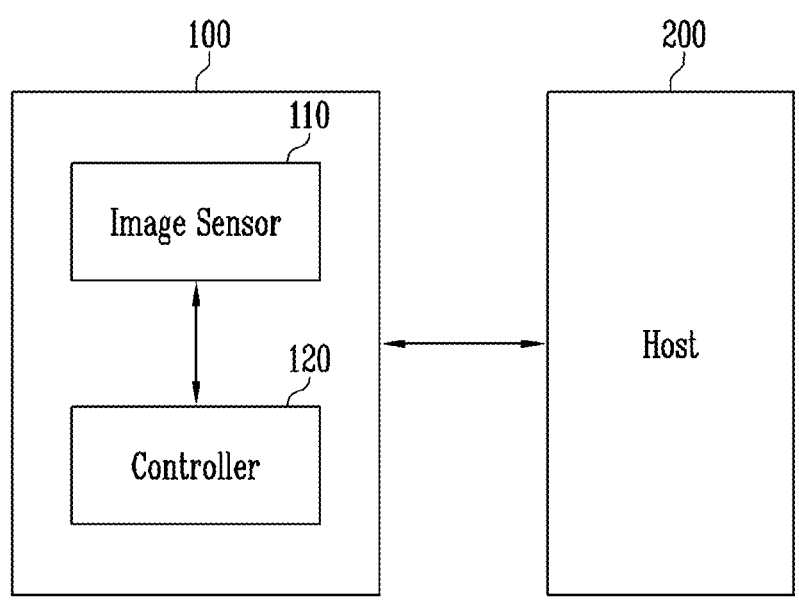
FIG. 1 is a diagram illustrating an electronic device according to an embodiment of the present disclosure.

FIG. 1 is a diagram illustrating an electronic device according to an embodiment of the present disclosure.

Referring to FIG. 1, the electronic device 100 according to an embodiment may obtain an image. In addition, the electronic device 100 may store, display, or output an output image, which is obtained by processing an image, to an external device. The electronic device 100, according to an embodiment, may output the output image to a host 200 according to a request of the host 200.

In an embodiment, the electronic device 100 may be implemented in a form of a packaged module, a part, or the like. In this case, the electronic device 100 may be mounted on the host 200. The host 200 may be implemented as various electronic devices. For example, the host 200 may be implemented as a digital camera, a mobile device, a smart phone, a personal computer (PC), a tablet PC, a notebook, a personal digital assistant (PDA), an enterprise digital assistant (EDA), a portable multimedia player (PMP), a wearable device, a black box, a robot, an autonomous vehicle, and the like.

In another embodiment, the electronic device 100 may be implemented as an electronic device separate from the host 200. For example, the electronic device 100 may be an imaging device, a digital camera, a camcorder, a closed-circuit television (CCTV), a webcam, a security camera, an industrial vision camera, a mobile device, a smart phone, a PC, a tablet PC, a notebook, a PDA, an EDA, a PMP, a wearable device, a black box, a robot, an autonomous vehicle, an in-vehicle vision camera, a set-top box, a game console, an electronic dictionary, an e-book reader, a desktop computer, a server, an MP3 player, a smart medical device, a television, a digital video disk (DVD) player, an audio, a refrigerator, an air conditioner, a cleaner, an oven, a microwave oven, a washing machine, an air purifier, a smart mirror, a smart window, an electronic key, an electronic picture frame, a digital billboard, a security control panel, and the like. Here, the wearable device may be a smart watch, a ring, a bracelet, an anklet, a necklace, glasses, a contact lens, a head-mounted-device (HMD), a skin pad, a tattoo, a biological transplant type circuit, or the like.

The electronic device 100 may include an image sensor 110 and a controller 120.

The image sensor 110 may obtain a raw image. Specifically, the image sensor 110 may obtain the raw image when a command that requests to obtain an image is received from the host 200 or the controller 120. To this end, the image sensor 110 may be implemented as a charge that is coupled device (CCD) sensor, a complementary metal oxide semiconductor (CMOS) sensor, or the like. In addition, the image sensor 110 may transmit the raw image to the controller 120.

The image sensor 110 may include a plurality of pixels. The plurality of pixels may be arranged in a matrix form. The plurality of pixels may be grouped into a plurality of pixel groups according to an exposure value. That is, the image sensor 110 may include the plurality of pixel groups. The plurality of pixel groups may correspond to a plurality of exposure values, respectively. That is, the plurality of pixel groups may have different exposure values. Here, the exposure value may indicate an exposure time during which the pixel senses a pixel value. For example, a first pixel group may include pixels, among the plurality of pixels, having a first exposure value. A second pixel group may include pixels, among the plurality of pixels, having a second exposure value.

The image sensor 110 may obtain pixel data through the plurality of pixels. The pixel data may include at least one of a position, a color, and the exposure value of the pixel.

The position of the pixel may indicate a position in which a corresponding pixel is arranged among the plurality of pixels. The plurality of pixels may be distinguished according to the position of the pixel. A pixel of a corresponding position may be selected through an address that indicates the position of the pixel.

The color of the pixel may indicate a color of light for the corresponding pixel. For example, a color of each of the plurality of pixels may be one of red, blue, and green.

The exposure value may indicate the exposure time. The exposure time may indicate a time period during which the pixel is exposed to light, or a time period during which the pixel senses the light to obtain the pixel value. In general, when the exposure time decreases, the pixel value may decrease because the amount of incidental light during the exposure time decreases, and when the exposure time increases, the pixel value may increase because the amount of incidental light during the exposure time increases. According to an embodiment, an individual exposure value may be set for each pixel. In this case, the pixel value of each pixel may be a value that is obtained during the exposure time that corresponds to the exposure value set for each pixel.

The controller 120 may control an overall operation of the electronic device 100. For example, the controller 120 may control the image sensor 110 to perform an operation that adjusts the exposure time or obtaining the image.

In an embodiment, the controller 120 may obtain a plurality of scale images based on the plurality of pixel groups that are included in the image sensor 110. For example, the controller 120 may generate a first scale image based on the pixel values that are obtained through the first pixel group and generate a second scale image based on the pixel values that are obtained through the second pixel group that is included in the image sensor 110. Here, the first pixel group may correspond to the first exposure value, and the second pixel group may correspond to the second exposure value. For example, the first pixel group may include pixels, among the plurality of pixels that are included in the image sensor 110, to which the first exposure value is set. The second pixel group may include pixels, among the plurality of pixels that are included in the image sensor 110, to which the second exposure value is set. Here, the first exposure value and the second exposure value may have different values. For example, the second exposure value may be greater than the first exposure value.

Specifically, the controller 120 may obtain the raw image from the image sensor 110. The raw image may include the plurality of pixel values that are obtained through the plurality of pixels. The controller 120 may obtain a plurality of images from one raw image. Each of the plurality of images may be an image with different exposure values. For example, a first image may include the pixel values that are obtained during the first exposure time that is indicated by the first exposure value. A second image may include the pixel values that are obtained during the second exposure time that is indicated by the second exposure value. Here, assuming that the second exposure value is greater than the first exposure value, the second exposure time may include the first exposure time. That is, the first exposure time may overlap with a portion of the second exposure time.

In addition, the controller 120 may obtain the plurality of scale images that are obtained by correcting the plurality of images by using the exposure value or the exposure time of each of the plurality of images.

In an embodiment, the controller 120 may generate a motion map based on the position of the first block, indicating an object in a first block group, corresponding to a first scale image and a position of a second block, indicating the object in a second block group, corresponding to a second scale image. Here, each of blocks of the first block group may correspond to one area of the first scale image, and each of blocks of the second block group may correspond to one area of the second scale image. The motion map may indicate the motion of the object or a positional change of the object. The motion map may include a plurality of motion values. The motion value may correspond to the pixel value. For example, the motion value and the pixel value may have a corresponding relationship with each other according to a position.

To this end, the controller 120 may select a scale image, among the first scale image and the second scale image, having the smallest exposure value (a minimum exposure value), as a reference scale image and may select a scale image with a different exposure value as a target scale image. Here, the target scale image may be referred to as a selection scale image.

Meanwhile, the above-described embodiment is merely an embodiment, and the number of scale images may be three or more. In this case, the controller 120 may generate the motion map, indicating the motion of the object, based on the reference scale image, among the plurality of scale images, having the smallest exposure value (that is, the minimum exposure value) and a scale image with a selected exposure value.

In an embodiment, the controller 120 may output the output image using the motion map. In an embodiment, the controller 120 may output the output image that is generated according to a weight operation by using the motion map as a weight for the first scale image and the second scale image. Meanwhile, this is merely an embodiment, and the number of scale images may be three or more. In this case, the controller 120 may generate the output image according to a weight operation by using the motion map as a weight for the reference scale image and the scale image with the selected exposure value. The controller 120 may output the generated output image.

According to the present disclosure, an electronic device and a method of operating the same for outputting an image with improved image quality while preventing a ghost phenomenon from occurring according to a motion of an object may be provided. Hereinafter, the present disclosure is more specifically described with reference to the accompanying drawings.

Figure 2A:
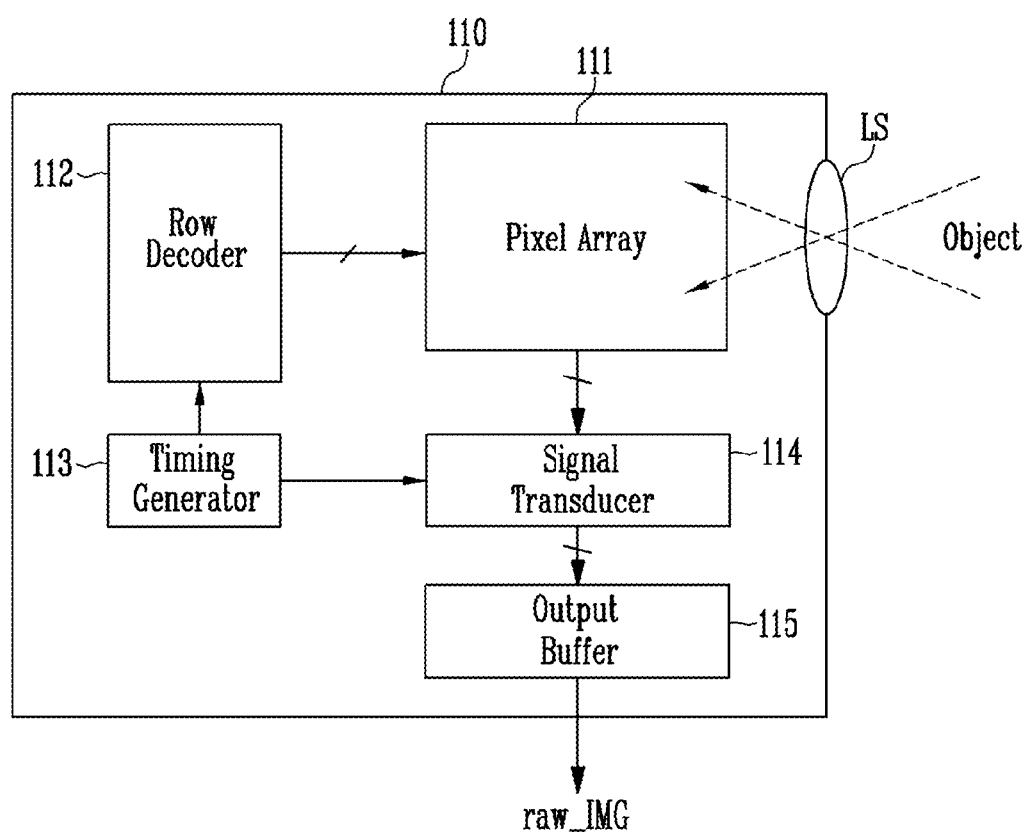
FIG. 2A is a diagram illustrating an image sensor according to an embodiment of the present disclosure.

FIG. 2A is a diagram illustrating an image sensor according to an embodiment of the present disclosure.

Referring to FIG. 2A, the image sensor 110 may include an optical lens LS, a pixel array 111, a row decoder 112, a timing generator 113, a signal converter (or a signal transducer) 114, and an output buffer 115.

The optical lens LS may refract light that is reflected from a subject. The light that is refracted through the optical lens LS may proceed to the pixel array 111. That is, the optical lens LS may refract incidental light to each of the pixels of the pixel array 111. The optical lens LS may be either one lens or an assembly of a plurality of lenses that are arranged in a proceed path of the light. In addition, the optical lens LS may include an assembly of micro lenses. The subject may include at least one of various elements, such as an object, an animal, a person, and a background that exists outside of the image sensor 110.

The pixel array 111 may generate an electrical signal that indicates an intensity or an amount of exposed light.

The pixel array 111 may include a plurality of pixels. The plurality of pixels may be arranged in a row direction and a column direction. The plurality of pixels that are included in the pixel array 111 may correspond to a plurality of pixels that are included in a raw image raw_IMG. The pixel of the pixel array 111 may be arranged in a physical area, and the pixel of the raw image raw_IMG may be arranged in a digital area. The pixel of the pixel array 111 and a pixel of an raw image raw_IMG may have a corresponding relationship between the same arrangement positions.

For example, a pixel (x, y) of the raw image raw_IMG may correspond to a pixel (x, y) of the pixel array 111. Here, x and y are natural numbers. In addition, a pixel value for the pixel (x, y) of the raw image raw_IMG may be proportional to the amount of light to which the pixel (x, y) of the pixel array 111 is exposed. The color of the pixel (x, y) of the image may be the same color as the color of a color filter that is included in the pixel (x, y) of the pixel array 111.

The pixel of the pixel array 111 may include the color filter and a sensing circuit. The color filter may be disposed on the sensing circuit. During an exposure time, light may pass through the color filter and reach the sensing circuit. The pixel may be referred to as a red pixel, a blue pixel, a green pixel, or the like according to the color of the color filter.

The sensing circuit may include a light sensing element. The light sensing element may generate an electrical signal by using a photoelectric effect when light is incidental. For example, the light sensing element may be implemented with various semiconductor elements, such as a p-n junction photodiode, a positive-intrinsic-negative (PIN) photodiode, an avalanche photodiode (APD), a phototransistor, or the like.

The color filter may be one of a red color filter, a green color filter, and a blue color filter. The red color filter may transmit light that indicates a red color by filtering incidental light. The green color filter may transmit light that indicates a green color by filtering incidental light. The blue color filter may transmit light that indicates a blue color by filtering incidental light. Meanwhile, this is merely an example, and at least one of the red color filter, the green color filter, and the blue color filter may be transformed into a color filter of a different color, such as a white color filter, a cyan color filter, or a yellow color filter, or a color filter of a different color may be added.

The plurality of color filters may be arranged according to a Bayer pattern. For example, the red color filter, the green color filter, and the blue color filter may be arranged for each unit area. In this case, one unit area may be divided into four sub-areas, such as an upper left sub-area, an upper right sub-area, a lower left sub-area, and a lower right sub-area. In each of the four sub-areas, color filters of the same color may be arranged in m×n. Here, m and n are natural numbers. For example, in a case of a quad Bayer pattern, color filters of the same color may be arranged in a 2×2 in each of the four sub-areas. For example, the green color filter may be arranged in each of the upper left sub-area and the lower right sub-area positioned in a diagonal direction, and the red color filter and the blue color filter may be respectively arranged in the upper right sub-area and the lower left sub-area that are positioned in another diagonal direction.

The row decoder 112 may select a pixel, among the plurality of pixels that are included in the pixel array 111, positioned in a row that corresponds to an address in response to the address and control signals that are output from the timing generator 113. Meanwhile, the timing generator 113 may set an exposure value for each pixel. For example, the timing generator 113 may set the exposure value for each pixel based on the controller 120.

The signal converter 114 may obtain the pixel value for each of the plurality of pixels based on each of signals that are output from the pixel array 111. The signal converter 114 may transmit the pixel values for the pixels that correspond to the selected row to the output buffer 115 based on the timing generator 113.

The output buffer 115 may store the pixel values for the pixels that are sequentially transmitted from the signal converter 114, and output the raw image raw_IMG with the pixel values for the pixels.

Meanwhile, the pixel value may be obtained based on the amount of the incidental light on the pixel during the exposure time. For example, the pixel value may be proportional to an amount of a charge that is accumulated by the light that is exposed during the exposure time.

As a specific example, the pixel may generate a current with a level that corresponds to the intensity of incidental light through the sensing circuit. The pixel may accumulate the charge through the current that is generated during the exposure time. The charge may be accumulated in the sensing circuit. The pixel may generate a voltage with a level that is proportional to the amount of the accumulated charge through the sensing circuit. At this time, the level of the generated voltage may indicate the pixel value.

In an embodiment, the pixel array 111 may include the plurality of pixels. The pixel array 111 may obtain the pixel value during the exposure time that is set for each of the plurality of pixels. In this case, the pixel array 111 may obtain one raw image raw_IMG that includes the pixels with the pixel values. At this time, the raw image raw_IMG may include the pixel values that are obtained during two or more different exposure times.

In an embodiment, the pixel array 111 may include a plurality of pixel groups. Here, different exposure times may be set in each of the plurality of pixel groups. Each pixel group may include a plurality of pixels that are arranged at a regular distance. Each pixel may be any one of the red pixel, the blue pixel, and the green pixel.

In a specific embodiment, the pixel array 111 may include a first pixel group and a second pixel group. The first pixel group may include a plurality of pixels to which a first exposure value is set. The second pixel group may include a plurality of pixels to which a second exposure value is set. The pixels that are included in each pixel group may sense light during the exposure time that corresponds to the exposure value set in each pixel group. The pixel array 111 may obtain the pixel value that corresponds to the amount of light that is sensed through each of the pixels that are included in each pixel group.

In another embodiment, the pixel array 111 may further include at least one pixel group that is different from the first pixel group and the second pixel group. In this case, the other pixel group may include a plurality of pixels to which an exposure value that is different from the first exposure value and the second exposure value is set. That is, the number of pixel groups may be determined according to the number of different exposure values.

Meanwhile, in the above-described embodiment, the image sensor 110 may be implemented as a mono type that obtains one raw image raw_IMG during a unit time through one sensor. However, this is merely an embodiment. The image sensor 110 may also be implemented as a multiple type that obtains a plurality of raw images raw_IMG during a unit time through a plurality of sensors.

To this end, the image sensor 110 may include a plurality of pixel arrays 111. The above-described optical lens LS may be disposed on each pixel array 111. The row decoder 112 may select a cell that is positioned in the row that corresponds to the address in response to the address and the control signals that are output from the timing generator 113. The signal converter 114 may obtain the pixel value for each of the plurality of pixels based on each of the signals that are output from the pixel array 111. The signal converter 114 may transmit the pixel values for the pixels that correspond to the selected row to the output buffer 115 based on the timing generator 113. The output buffer 115 may store the pixel values for the pixels that are sequentially transmitted from the signal converter 114 and may output the raw image raw_IMG that includes the pixel values for the pixels. That is, the image sensor 110 may output the same number of raw images raw_IMG as the number of the plurality of pixel arrays 111.

Figure 2B:
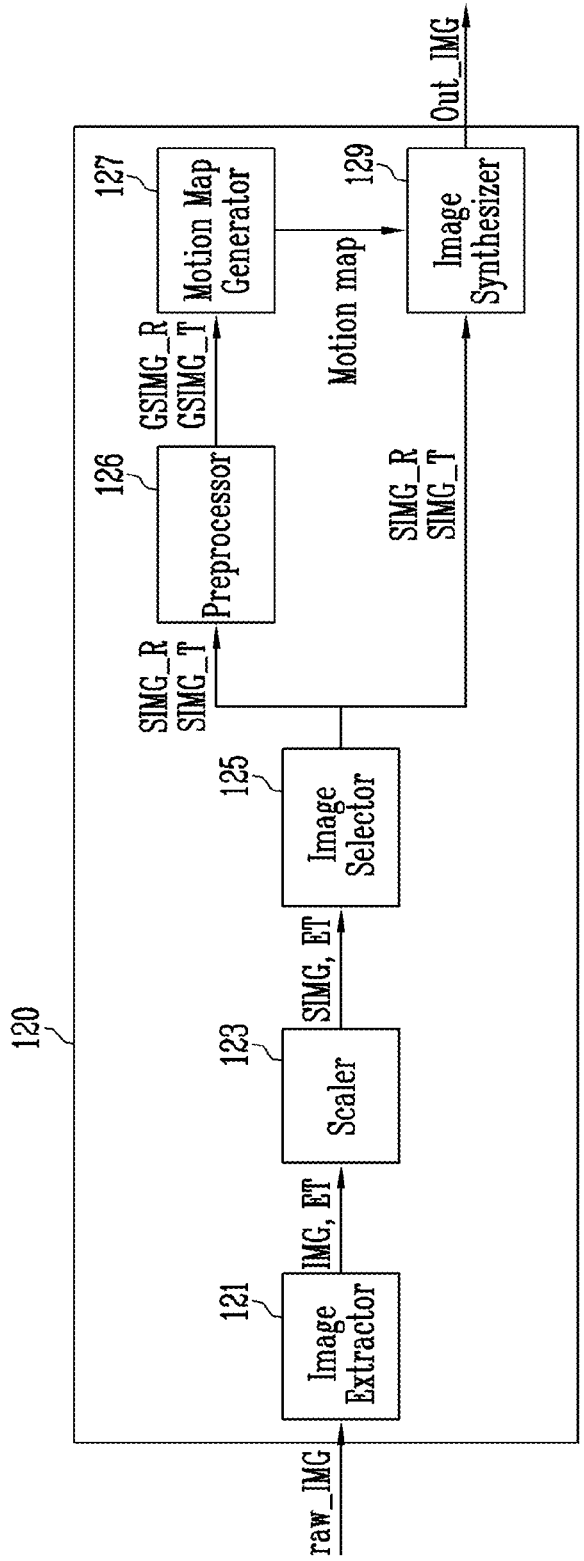
FIG. 2B is a diagram illustrating a controller according to an embodiment of the present disclosure.

FIG. 2B is a diagram illustrating a controller according to an embodiment of the present disclosure.

Referring to FIG. 2B, the controller 120 may include an image extractor 121, a scaler 123, a motion map generator 127, and an image synthesizer 129. In addition, the controller 120 may further include at least one of an image selector 125 and a preprocessor 126. Here, the image extractor 121, the scaler 123, the motion map generator 127, and the image synthesizer 129 may be implemented as a software module that allows the controller 120 to perform a corresponding operation. However, they are not limited thereto and may be implemented as a hardware module (for example, a circuit or the like) that allows the controller 120 to perform the corresponding operation.

The image extractor 121 may divide the raw image raw_IMG that is received from the image sensor 110 into a plurality of images IMG. Specifically, the image extractor 121 may generate the plurality of images IMG from the raw image raw_IMG that is received from the image sensor 110 according to an exposure value ET. The plurality of images IMG that are generated by the image extractor 121 may be transmitted to the scaler 123.

In an embodiment, when the raw image raw_IMG includes the pixel values that are obtained according to the first exposure value and the pixel values that are obtained according to the second exposure value, the image extractor 121 may generate a first image with the pixel values that are obtained according to the first exposure value through the first pixel group and a second image with the pixel values, among the pixel values that are included in the raw image raw_IMG that is obtained through the pixel array 111, obtained according to the second exposure value through the second pixel group.

In an embodiment, when the raw image raw_IMG includes pixel values that are obtained according to a first exposure value, pixel values that are obtained according to a second exposure value, and pixel values that are obtained according to a third exposure value, the image extractor 121 may generate a first image including the pixel values that are obtained according to the first exposure value, a second image with the pixel values that are obtained according to the second exposure value, and a third image with the pixel values, among the pixel values that are included in the raw image raw_IMG that is obtained through the pixel array 111, obtained according to the third exposure value.

The scaler 123 may receive the plurality of images IMG. The scaler 123 may receive the exposure value ET for each image IMG.

Specifically, each of the plurality of images may include a plurality of pixel values. Each of the plurality of images may include the pixel values that are obtained according to different exposure values. For example, the plurality of images may include a first image with a first exposure value, a second image with a second exposure value, a third image with a third exposure value, and a fourth image with a fourth exposure value. Specifically, the first image may include pixel values that are obtained during a first exposure time that is indicated by the first exposure value through a first pixel group. The second image may include pixel values that are obtained during a second exposure time that is indicated by the second exposure value through a second pixel group. The third image may include pixel values that are obtained during a third exposure time that is indicated by the third exposure value through a third pixel group. The fourth image may include pixel values that are obtained during a fourth exposure time that is indicated by the fourth exposure value through a fourth pixel group. Here, it is assumed that the exposure value and the exposure time are proportional to each other. In the present disclosure, unless otherwise specified, it is assumed that values are larger in an order of the first exposure value, the second exposure value, the third exposure value, and the fourth exposure value.

The scaler 123 may generate a plurality of scale images SIMG that correspond to different exposure values by correcting the plurality of images IMG with different exposure values. This is because, when the same area of the plurality of images IMG is compared, the pixel value tends to be smaller as the exposure value is smaller and the pixel value tends to be larger as the exposure value is larger. That is, it is for adjusting images with different exposure values to an equal condition.

In an embodiment, the scaler 123 may correct the pixel values of the first image to generate a first scale image with the corrected pixel values. The scaler 123 may correct the pixel values of the second image to generate a second scale image with the corrected pixel values. In addition, the scaler 123 may correct the pixel values of the third image to generate a third scale image with the corrected pixel values. The scaler 123 may correct the pixel values of the fourth image to generate a fourth scale image with the corrected pixel values.

In an embodiment, the scaler 123 may calculate an exposure ratio that is obtained by dividing a largest exposure value, among the exposure values of each of the plurality of images IMG, by the exposure value of each image. The scaler 123 may obtain the pixel values in which the pixel values of each image are corrected through an operation that multiplies the exposure ratio by each of the pixel values that are included in each image. The scaler 123 may obtain the scale image SIMG with the corrected pixel values. More specific details are described with reference to FIGS. 5A and 5B.

The scaler 123 may correct the pixel values of the pixels of each of the plurality of images IMG by using the exposure value of each of the plurality of images IMG and may obtain the plurality of scale images SIMG that are obtained by converting a color of each of the pixels of the plurality of images IMG into a grayscale. The color of the pixels may be three channels, such as red, green, and blue, and the grayscale may be a single channel of black and white. More specific details are described with reference to FIG. 6A.

The image selector 125 may determine a scale image, among the plurality of scale images SIMG, having a minimum exposure value, as a reference scale image SIMG_R. The image selector 125 may determine one or more scale images, among the plurality of scale images SIMG, different from the reference scale image SIMG_R, as a target scale image SIMG_T. One corresponding motion map may be generated with respect to each target scale image SIMG_T.

The preprocessor 126 may perform preprocessing on the plurality of scale images SIMG. The plurality of scale images SIMG may include the reference scale image SIMG_R and one or more target scale images SIMG_T. This may be for generating a motion map that accurately indicates the motion of the object or for reducing the amount of operation that is required to generate the motion map.

In an embodiment, the preprocessor 126 may obtain grayscale images that are obtained by converting the color of the plurality of scale images SIMG into the grayscales. Here, the colors of the plurality of scale images SIMG may include three channels of a red color, a green color, and a blue color. The grayscale images may include a reference grayscale image GSIMG_R and one or more target grayscale images GSIMG_T. For example, the preprocessor 126 may obtain a reference grayscale image GSIMG_R that is obtained by converting a color of the reference scale image SIMG_R into a grayscale. The preprocessor 126 may obtain the target grayscale image GSIMG_T that is obtained by converting a color of the target scale image SIMG_T into a grayscale.

Meanwhile, according to an embodiment of the present disclosure, the preprocessor 126 may be omitted. In this case, the image selector 125 may transmit the reference scale image SIMG_R and one or more target scale images SIMG_T to the motion map generator 127.

The motion map generator 127 may generate a motion map for each of the target scale images SIMG_T. Alternatively, the motion map generator 127 may generate a motion map for each of the target grayscale images GSIMG_T. Hereinafter, for convenience of description, contents of generation of the motion map for each of the target scale images SIMG_T are described.

In an embodiment, the motion map generator 127 may generate a motion map that indicates the motion of the object based on the position of the first block that indicates the object in the first block group and a position of the second block that indicates the object in the second block group.

Here, the first block group may correspond to the first scale image. Any one of the plurality of blocks that is included in the first block group may correspond to one area of the first scale image. For example, the first block group may include a plurality of first blocks. The first scale image may include a plurality of first areas. Here, the first block may correspond to the first area. The first block may have a block value that is calculated based on pixel values that are included in the first area. That is, one block value may be a value that is calculated by using a plurality of pixel values. Meanwhile, the second block group may correspond to the second scale image. The second block group may include a plurality of second blocks. The second scale image may include a plurality of second areas. The second block may correspond to the second area. The second block may have a block value that is calculated based on pixel values that are included in the second area.

The motion map may be generated for each of remaining target scale images SIMG_T, among the plurality of scale images SIMG, except for the reference scale image SIMG_R. That is, the number of motion maps may be the number that is obtained by subtracting one from the number of the plurality of scale images SIMG. Meanwhile, the scale images SIMG that are used to generate the motion map may be grayscale images that are converted to a grayscale.

The motion map may correspond to the first block group (or the second block group). The motion map may include a plurality of motion values. Each motion value may correspond to each block that is included in the first block group (or the second block group). Here, the motion value may indicate a degree to which the motion of the object occurs at a position that is indicated by a corresponding block. The motion value may be a value that is calculated based on a block value that is included in the corresponding block.

The motion value may be used as a weight for a weight operation. Specifically, the motion value may have a positional relationship that corresponds to one area of the image that corresponds to the block. In this case, the motion value may be used as the weight for the pixel values that are included in one area of the corresponding image. As the motion value increases, the degree to which the motion of the object occurs may increase. That is, as the motion value increases, the motion value may indicate that the object moved farther or faster.

Meanwhile, among the first scale image and the second scale image, a scale image with a small exposure value may be predetermined as the reference scale image SIMG_R, and another scale image may be predetermined as the target scale image SIMG_T.

In an embodiment, the motion map generator 127 may generate the motion map based on the distance between a position of an object that is included in the reference scale image SIMG_R and a position of an object that is included in the scale image SIMG with the selected exposure value.

In a specific embodiment, when the distance is greater than a minimum reference value and is equal to or less than a maximum reference value, the motion map generator 127 may increase the motion value, among a plurality of motion values, corresponding to the position of the object, included in the motion map as the distance increases. That is, the motion value that corresponds to the position of the object may be a value that is proportional to the distance. In an embodiment, when the distance is equal to or less than the minimum reference value, the motion map generator 127 may adjust the motion value, among the plurality of motion values, corresponding to the position of the object, included in the motion map to a value of 0. In an embodiment, when the distance is greater than the maximum reference value, the motion map generator 127 may adjust the motion value, among the plurality of motion values, corresponding to the position of the object, included in the motion map to a value of 1.

The image synthesizer 129 may generate an output image Out_IMG according to the weight operation by using the motion map as the weight for the reference scale image and the scale image, among the plurality of scale images SIMG, having the selected exposure value. The image synthesizer 129 may output the output image Out_IMG.

In an embodiment, the image synthesizer 129 may increase the weight for the pixel values of the reference scale image as the motion value increases. As the motion value increases, the image synthesizer 129 may decrease the weight for the pixel values of the target scale image. As the motion value increases, the image synthesizer 129 may generate the output image according to the weight operation that increases the weight for the pixel values of the reference scale image and decreasing the weight for the pixel values of the target scale image.

Regarding this, when the output image Out_IMG is generated according to a synthesis of images, the possibility of a ghost phenomenon occurring increases at a position in which the motion value is large. According to the present disclosure, the ghost phenomenon may be prevented from occurring, by applying the weight for the reference scale image with the small exposure value as a large value and applying the weight for the scale image with the large exposure value as a small value at the position in which the motion value is large.

FIG. 2C is a diagram illustrating detailed configurations of a scaler, a preprocessor, and a motion map generator according to an embodiment of the present disclosure.

Referring to (1) of FIG. 2C, the scaler 123 may include a maximum exposure value determiner 123-1, an exposure value ratio calculator 123-3, and a pixel value corrector 123-5.

The maximum exposure value determiner 123-1 may determine the largest value, among the plurality of exposure values, as a maximum exposure value. The maximum exposure value determiner 123-1 may output information regarding the maximum exposure value.

In an embodiment, it is assumed that the plurality of exposure values include the first exposure value and the second exposure value. In this case, the maximum exposure value determiner 123-1 may determine the largest value, among the first exposure value and the second exposure value, as the maximum exposure value.

The exposure value ratio calculator 123-3 may output the information regarding the ratio value that is obtained by dividing the maximum exposure value by each of the plurality of exposure values.

In an embodiment, it is assumed that the plurality of exposure values include the first exposure value and the second exposure value. In this case, the exposure value ratio calculator 123-3 may output information regarding the first ratio value that is obtained by dividing the maximum exposure value by the first exposure value and a second ratio value that is obtained by dividing the maximum exposure value by the second exposure value.

The pixel value corrector 123-5 may generate a plurality of scale images by correcting each of the plurality of images. Taking the first image as an example, the pixel value corrector 123-5 may generate a first scale image by multiplying pixel values that are included in the first image by a first ratio that corresponds to the first image. In this case, the pixel values that are included in the first scale image may be values that are obtained by multiplying the pixel values of the first image by the first exposure ratio value, respectively.

In an embodiment, it is assumed that the plurality of exposure values include the first exposure value and the second exposure value. In this case, the pixel value corrector 123-5 may generate the first scale image in which the pixel values of the first image are corrected with the values that are obtained by multiplying the pixel values of the first image by the first ratio value. The pixel value corrector 123-5 may generate the second scale image in which the pixel values of the second image are corrected by the values that are obtained by multiplying the pixel values of the second image by the second ratio value.

Referring to (2) of FIG. 2C, in an embodiment, the preprocessor 126 may include a grayscale converter 126-1.

The grayscale converter 126-1 may convert a color of each of the plurality of scale images into a grayscale color. Specifically, the grayscale converter 126-1 may generate the grayscale image with the pixel values that are obtained by converting the color of the scale image into the grayscale color.

In an embodiment, the grayscale converter 126-1 may generate a first grayscale image that respectively includes the pixel value of the grayscale color that is obtained by using the pixel values of the red color, the green color, and the blue color that are included in one area of the first scale image. The grayscale converter 126-1 may generate a second grayscale image that respectively includes the pixel value of the grayscale color that is obtained by using the pixel values of the red color, the green color, and the blue color that are included in one area of the second scale image. In this case, the block value calculator 127-1 of (3) of FIG. 2C may respectively calculate an average value of the pixel values that are included in one area of the first grayscale image as the block value of one block that is included in the first block group and may respectively calculate an average value of the pixel values that are included in one area of the second grayscale image as the block value of one block that is included in the second block group.

In an embodiment, the preprocessor 126 may include a pyramid image generator 126-3.

The pyramid image generator 126-3 may generate a plurality of pyramid images in which a resolution of the plurality of scale images is reduced. Alternatively, the pyramid image generator 126-3 may generate a plurality of pyramid images in which a resolution of the plurality of grayscale images is reduced.

In an embodiment, the pyramid image generator 126-3 may obtain a reference pyramid image that is obtained by decreasing a resolution of the reference scale image and a selection pyramid image that is obtained by decreasing a resolution of the target scale image. Here, the selection pyramid image may be referred to as a target pyramid image. In other words, the pyramid image generator 126-3 may obtain a first pyramid image in which the resolution of the first scale image is reduced and a second pyramid image in which the resolution of the second scale image is reduced. The first pyramid image may include a plurality of first pyramid areas. The first scale image may include a plurality of first areas. The first area may correspond to the first pyramid area. The number of pixel values that are included in the first area may be greater than the number of pixel values that are included in the first pyramid area. The second pyramid image may include a plurality of second pyramid areas. The second area may correspond to the second pyramid area. The number of pixel values that are included in the second area may be greater than the number of pixel values that are included in the second pyramid area. In this case, the block value calculator 127-1 of (3) of FIG. 2C may calculate the block value of each block that is included in a first pyramid block group, by using the pixel values that are included in one area of the first pyramid image. The block value calculator 127-1 may calculate the block value of each block that is included in a second pyramid block group by using the pixel values that are included in the second pyramid image.

Referring to (3) of FIG. 2C, the motion map generator 127 may include a block value calculator 127-1, a block position detector 127-3, a block distance calculator 127-5, and a motion value calculator 127-7.

The block value calculator 127-1 may calculate the block values of the blocks by using the pixel values that are included in the scale image. One block may correspond to one of a plurality of areas that are included in the scale image. The block value of one block may be calculated by using the pixel values that are included in one of the plurality of areas that are included in the scale image.

In an embodiment, the block value calculator 127-1 may calculate the block value of each block that is included in the first block group by using the pixel values that are included in the first scale image. The block value calculator 127-1 may calculate the block value of each block that is included in the second block group by using the pixel values that are included in the second scale image.

In an embodiment, the block value calculator 127-1 may calculate an average value of the pixel values that are included in one area of the first scale image as the block value of one block that is included in the first block group. The block value calculator 127-1 may calculate an average value of the pixel values that are included in one area of the second scale image as the block value of one block that is included in the second block group. Here, one area may correspond to each block.

The block position detector 127-3 may determine a block indicating the object in each block group.

In an embodiment, the block position detector 127-3 may select the block value of any one block, among the plurality of blocks, included in each block group, and determine the selected block as the block indicating the object when a difference between the block value of the selected block and a block value of an adjacent block exceeds a reference value.

In an embodiment, the block position detector 127-3 may compare the first block group that corresponds to the reference scale image and the second block group that corresponds to the target scale image. The block position detector 127-3 may differentiate the block values of the blocks that are included in the first block group and the block values of the blocks that are included in the second block group between the blocks at the same position. A value close to 0, among the differentiated result values, may indicate an area in which a movement of the object does not occur or a background area in which the object does not exist. Among the differentiated result values, a value greater than the reference value may indicate an area in which the movement of the object occurs. The block position detector 127-3 may determine a block of a position with a value greater than the reference value, among the differentiated result values, as the block indicating the object.

In an embodiment, the block position detector 127-3 may determine a first pyramid block with the block value that indicates the object in the first pyramid block group and may determine a second pyramid block with the block value that indicates the object in the second pyramid block group. The block position detector 127-3 may determine a block, among the blocks that are included in the first block group as the first block, corresponding to a position of the first pyramid block, and may determine a block, among the blocks that are included in the second block group as the second block, corresponding to a position of the second pyramid block.

The block distance calculator 127-5 may calculate the distance between the position of the first block, among the blocks that are included in the first block group, having the block value indicating the object and the position of the second block, among the blocks that are included in the second block group, having the block value indicating the object. Here, the position of the first block may indicate a relative position of the first block in relation with the plurality of blocks that are included in the first block group. The position of the second block may indicate the relative position of the second block in relation with the plurality of blocks that are included in the second block group.

The motion value calculator 127-7 may calculate the motion value to be included in the motion map based on the distance between the position of the first block, among the blocks that are included in the first block group, indicating the object and the position of the second block, among the blocks that are included in the second block group, indicating the object.

In an embodiment, when the distance between the first block and the second block is greater than the minimum reference value and is equal to or less than the maximum reference value, the motion value calculator 127-7 may calculate a value that is proportional to the distance as the motion value. When the distance is equal to or less than the minimum reference value, the motion value calculator 127-7 may calculate a value of 0 as the motion value. When the distance is greater than the maximum reference value, the motion value calculator 127-7 may calculate a value of 1 as the motion value.

FIG. 3 is a diagram illustrating a method of operating an electronic device according to an embodiment of the present disclosure.

Referring to FIG. 3, the method of operating the electronic device 100 may include obtaining a plurality of images to which different exposure times are set (S310), obtaining a plurality of scale images, based on the exposure times of the plurality of images (S320), generating a motion map based on a position of an object included in each of the plurality of scale images (S330), and generating an output image through a weight operation of the plurality of scale images and the motion map (S340).

Specifically, the plurality of images to which the different exposure times are set may be obtained (S310). That is, the plurality of images may be obtained from the plurality of pixel groups. Each of the plurality of pixel groups may sense the pixel values during the different exposure times.

In an embodiment, obtaining the plurality of images may include obtaining the pixel values during the exposure time that is individually set in each of the plurality of pixels through the pixel array 111 with the plurality of pixels, obtaining the plurality of images, each including the pixels with the pixel values that are obtained during the same exposure time.

In addition, the plurality of scale images may be obtained, based on the exposure time of the plurality of images (S320). That is, the plurality of scale images that are obtained by correcting the plurality of images may be obtained by using the exposure time of each of the plurality of images.

In an embodiment, obtaining the plurality of scale images may include obtaining the scale image that is obtained by correcting the pixels of the selected image through an operation that multiplies a ratio that is obtained by dividing the largest exposure time, among the exposure times, each of the plurality of images by the exposure time of the selected image, among the plurality of images, by each of the pixel values of the pixels that are included in the selected image.

In an embodiment, obtaining the plurality of scale images may include correcting the pixel values of the pixels of each of the plurality of images, by using the exposure time of each of the plurality of images, and obtaining the plurality of scale images that are obtained by converting the color of each of the pixels of the plurality of images into a grayscale.

In addition, a motion map may be generated based on the position of the object that is included in each of the plurality of scale images (S330). That is, the motion map that indicates the positional change of the object may be generated based on the reference scale image and the selection scale image, among the plurality of scale images, having the minimum exposure time. The selection scale image may be a scale image, among the plurality of scale images, having an exposure time that is different from the minimum exposure time.

In an embodiment, generating the motion map may include generating the motion map based on the difference between the position of the object that is included in the reference scale image and the position of the object that is included in the scale image with the selected exposure time. Here, the positional difference may indicate a distance.

Generating the motion map may include increasing the motion value, among the plurality of motion values that are included in the motion map, corresponding to the position of the object when the positional difference increases, the positional difference increasing in a case in which the positional difference is greater than the minimum reference value and is equal to or less than the maximum reference value.

In an embodiment, generating the motion map may include adjusting the motion value, among the plurality of motion values that are included in the motion map, corresponding to the position of the object to a value of 0 when the positional difference is equal to or less than the minimum reference value.

In an embodiment, generating the motion map may include adjusting the motion value, among the plurality of motion values that are included in the motion map, corresponding to the position of the object to a value of 1 when the positional difference is greater than the maximum reference value.

In an embodiment, generating the motion map may include generating the reference pyramid image in which the reference scale image is reduced to a preset resolution, generating the pyramid image in which the scale image with the selected exposure time is reduced to a preset resolution, and generating the motion map based on the positional difference between the object included in the reference pyramid image and the object included in the pyramid image.

In addition, an output image may be generated through a weight operation of the plurality of scale images and the motion map (S340). That is, the output image synthesized by using the reference scale image and the selection scale image as the weight may be output.

FIGS. 4A to 4D are diagrams illustrating an image according to an embodiment of the present disclosure. Here, FIGS. 4A to 4D show an image 400 and a portion of first to fourth images 410 to 440.

Referring to FIGS. 4A to 4D, the controller 120 according to an embodiment of the present disclosure may obtain the image 400 through the image sensor 110 with the color filter that is arranged according to the Bayer pattern.

In this case, the image 400 may include the plurality of pixels that are arranged according to the Bayer pattern. The Bayer pattern may indicate a method in which a red pixel R and a blue pixel B are positioned in a diagonal direction each other in the unit area, and green pixels Gr and Gb are arranged in a remaining position.

In an embodiment, the image 400 may include a plurality of unit areas. Each unit area may include four sub-areas arranged in 2×2. For example, one unit area may include the upper left sub-area, the upper right sub-area, the lower left sub-area, and the lower right sub-area. Each sub-area may include pixels of the same color arranged m×n. Here, m and n are natural numbers. As a specific example, a case of a quad Bayer pattern in which m and n are 2 is described as an example. In this case, the first green pixels Gr may be arranged in 2×2 in the upper left sub-area. In the upper right sub-area, the red pixels R may be arranged in 2×2. In the lower left sub-area, the blue pixels B may be arranged in 2×2. In the lower right sub-area, the second green pixels Gb may be arranged in 2×2. However, this is merely an example, and each of m and n may be transformed into various natural numbers.

The same exposure value may be set to pixels that are positioned at relatively the same position in each sub-area. For example, in each sub-area, a first exposure value $ET\_1$ may be set to pixels that are positioned at (1, 1), a second exposure value $ET\_2$ may be set to pixels that are positioned at (2, 1), a third exposure value $ET\_3$ may be set to pixels that are positioned at (1, 2), and a fourth exposure value $ET\_4$ may be set to pixels positioned at (2, 2). In an example, exposure values are larger in an order of the first exposure value ET_1, the second exposure value ET_2, the third exposure value ET_3, and the fourth exposure value ET_4. Each pixel may include a pixel value that is obtained during an exposure time that is indicated by the exposure value set to each pixel.

The controller 120 may obtain the plurality of images 410 to 440 based on pixels to which the same exposure value is set in the image 400. Meanwhile, such an operation may be an operation that is performed by the preprocessor that is included in the controller 120.

Figure 4A:
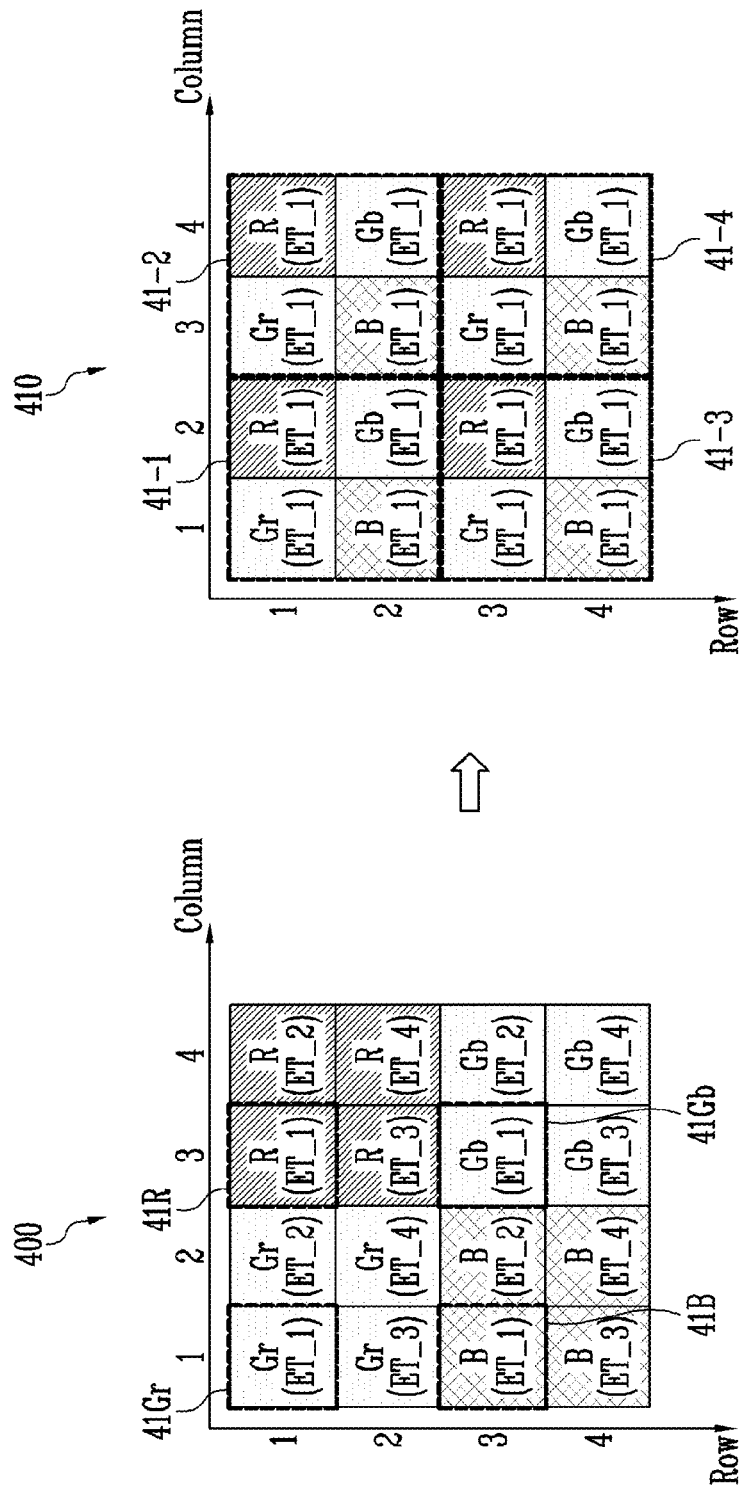
FIGS. 4A to 4D are diagrams illustrating an image according to an embodiment of the present disclosure.

Referring to FIG. 4A, the controller 120 may extract pixels 41Gr, 41R, 41B, and 41Gb, among the plurality of pixels that are included in the image 400, to which the first exposure value ET_1 is set. The controller 120 may obtain a first image 410 in which the extracted pixels 41Gr, 41R, 41B, and 41Gb are repeatedly disposed in an area that corresponds to the extracted pixels 41Gr, 41R, 41B, and 41Gb. The area that corresponds to the extracted pixels 41Gr, 41R, 41B, and 41Gb may be sub-areas 41-1, 41-2, 41-3, and 41-4 in which one of the extracted pixels 41Gr, 41R, 41B, and 41Gb is positioned.

Figure 4B:
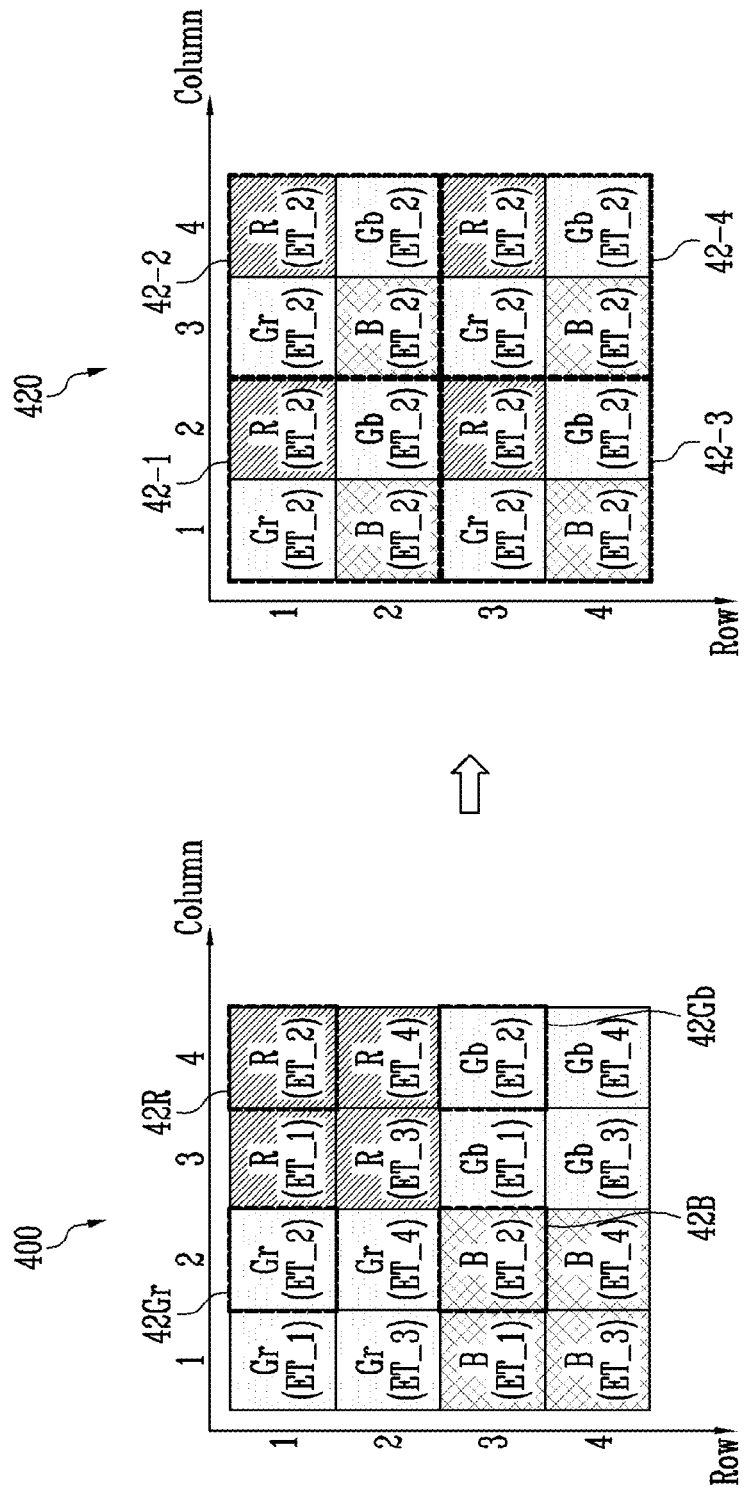

Referring to FIG. 4B, the controller 120 may extract pixels 42Gr, 42R, 42B, and 42Gb, among the plurality of pixels that are included in the image 400, to which the second exposure value ET_2 is set. The controller 120 may obtain a second image 420 in which the extracted pixels 42Gr, 42R, 42B, and 42Gb are repeatedly disposed in an area that corresponds to the extracted pixels 42Gr, 42R, 42B, and 42Gb. The area that corresponds to the extracted pixels 42Gr, 42R, 42B, and 42Gb may be sub-areas 42-1, 42-2, 42-3, and 42-4 in which one of the extracted pixels 42Gr, 42R, 42B, and 42Gb is positioned.

Figure 4C:
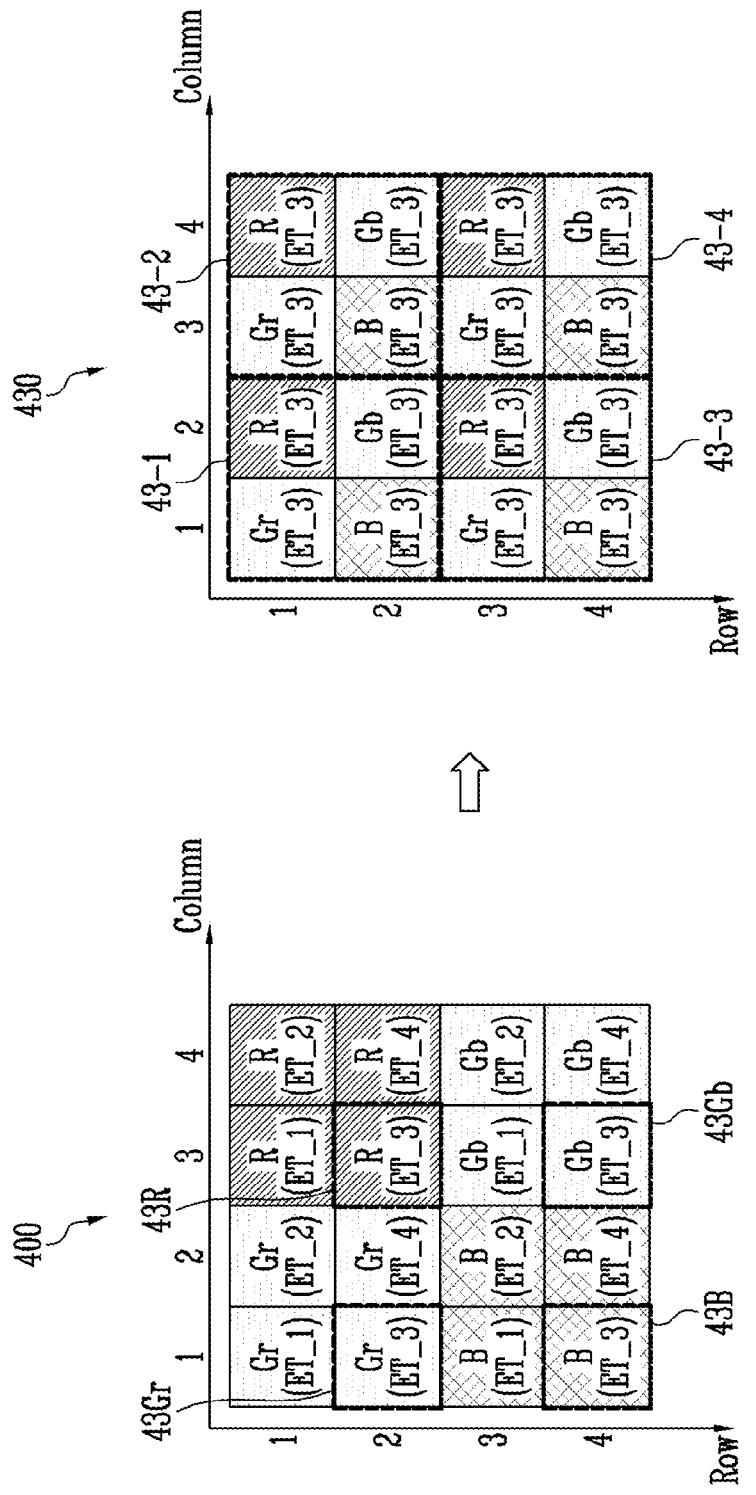

Referring to FIG. 4C, the controller 120 may extract pixels 43Gr, 43R, 43B, and 43Gb, among the plurality of pixels that are included in the image 400, to which the third exposure value ET_3 is set. The controller 120 may obtain a third image 430 in which the extracted pixels 43Gr, 43R, 43B, and 43Gb are repeatedly disposed in an area that corresponds to the extracted pixels 43Gr, 43R, 43B, and 43Gb. The area that corresponds to the extracted pixels 43Gr, 43R, 43B, and 43Gb may be sub-areas 43-1, 43-2, 43-3, and 43-4 in which one of the extracted pixels 43Gr, 43R, 43B, and 43Gb is positioned.

Figure 4D:
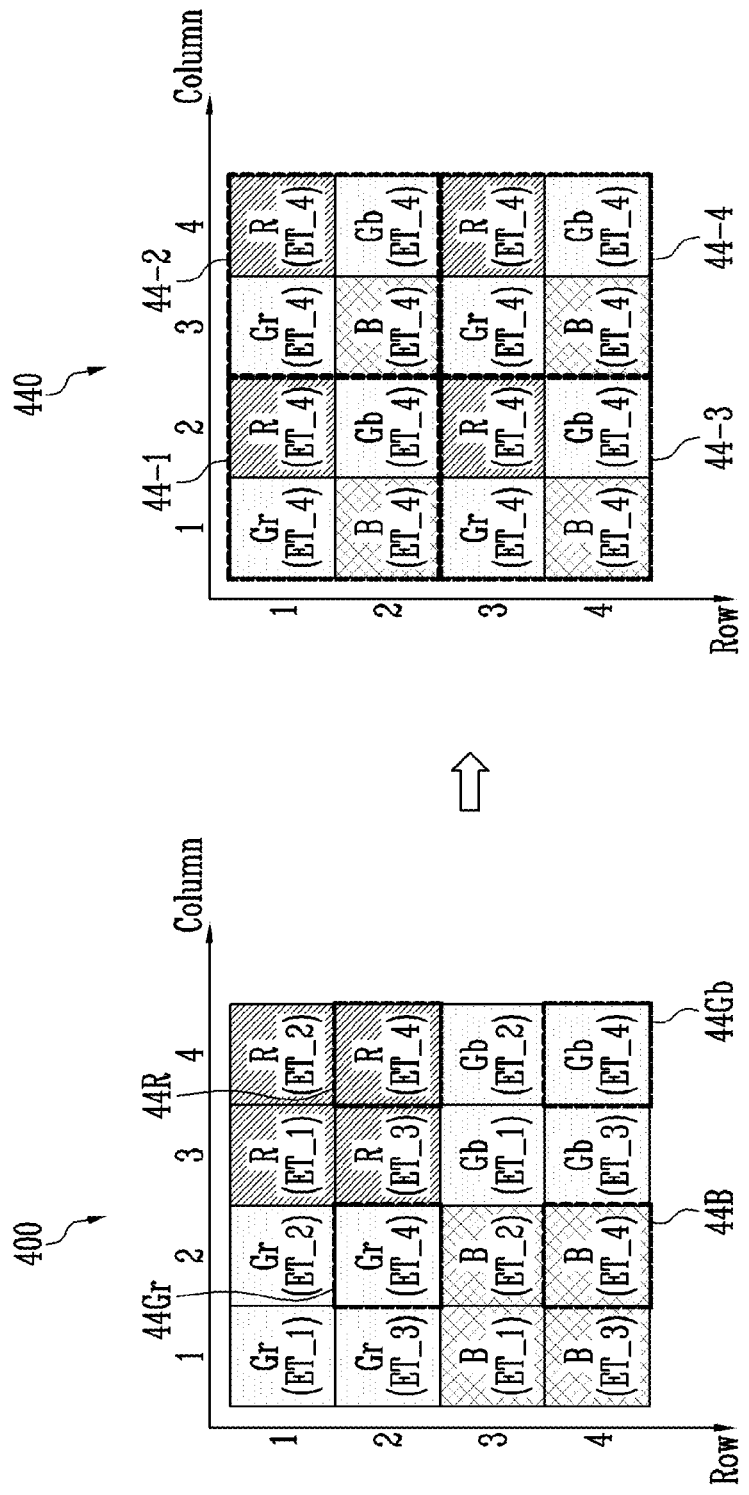

Referring to FIG. 4D, the controller 120 may extract pixels 44Gr, 44R, 44B, and 44Gb, among the plurality of pixels that are included in the image 400, to which the fourth exposure value ET_4 is set. The controller 120 may obtain a fourth image 440 in which the extracted pixels 44Gr, 44R, 44B, and 44Gb are repeatedly disposed in an area that corresponds to the extracted pixels 44Gr, 44R, 44B, and 44Gb. The area that corresponds to the extracted pixels 44Gr, 44R, 44B, and 44Gb may be sub-areas 44-1, 44-2, 44-3, and 44-4 in which one of the extracted pixels 44Gr, 44R, 44B, and 44Gb is positioned.

Figure 5A:
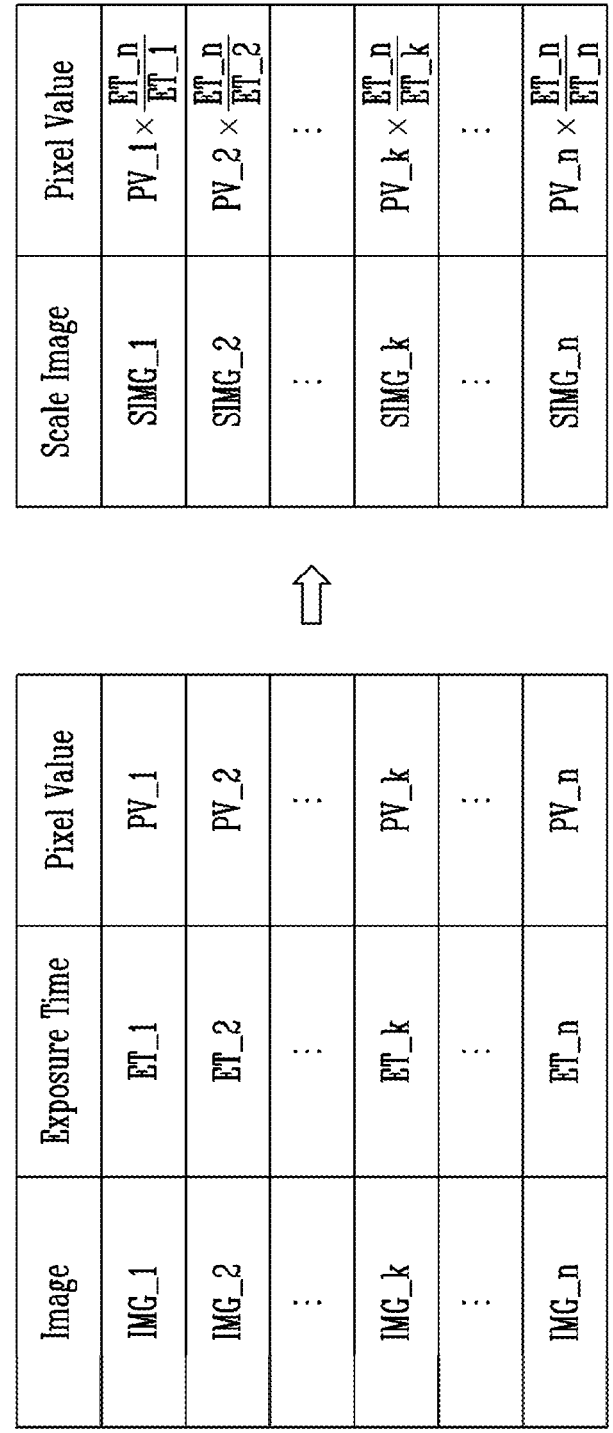
FIGS. 5A and 5B are diagrams illustrating a scale image according to an embodiment of the present disclosure.
Figure 5B:
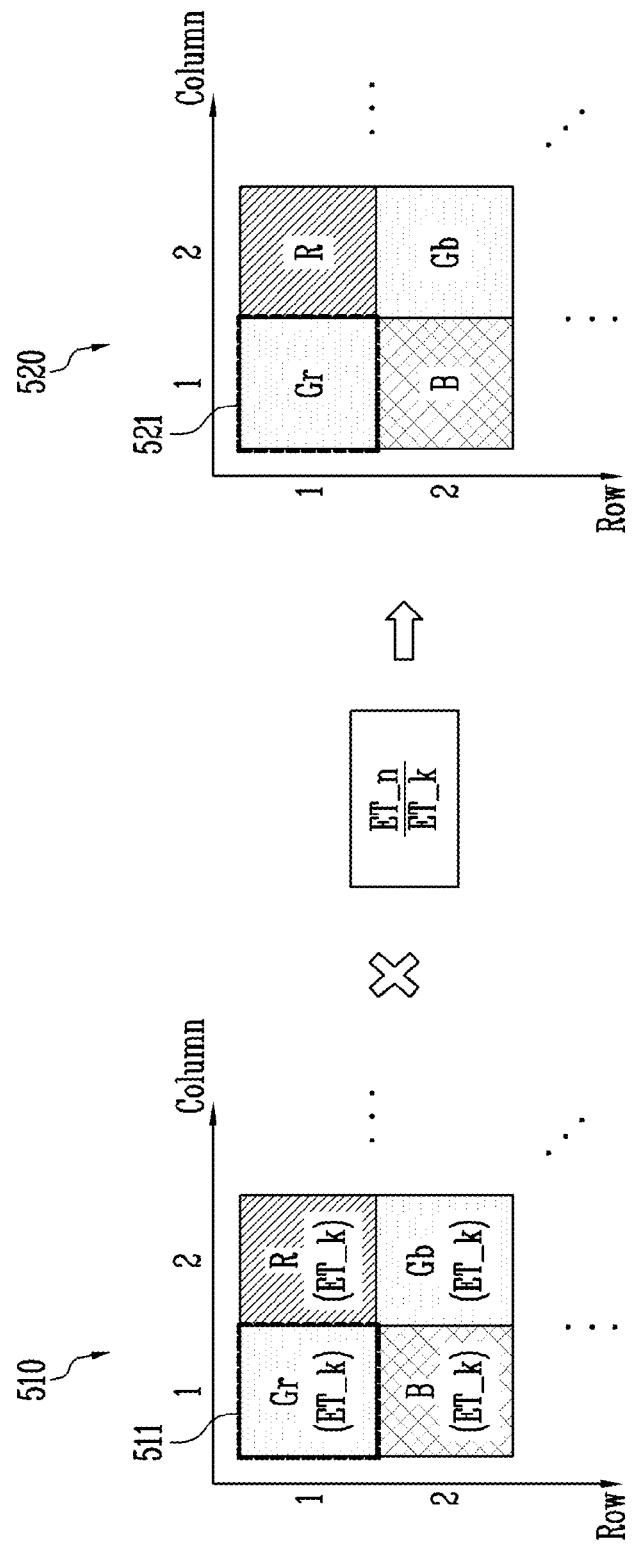

FIGS. 5A and 5B are diagrams illustrating a scale image according to an embodiment of the present disclosure.

Referring to FIG. 5A, the controller 120 may obtain a plurality of images IMG_1 to IMG_n to which different exposure values ET_1 to ET_n are set, based on the pixel values of the pixels that are obtained from the image sensor 110. For example, the controller 120 may obtain a first image IMG_1 including pixel values, among the plurality of pixel values that are obtained from the image sensor 110, obtained during a first exposure time that is indicated by a first exposure value ET_1. The controller 120 may obtain a second image IMG_2 with pixel values, among the plurality of pixel values that are obtained from the image sensor 110, obtained during a second exposure time that is indicated by the second exposure value ET_2.

The controller 120 may generate a plurality of scale images in which pixel values of a plurality of images with different exposure values are corrected. In an embodiment, the controller 120 may obtain the scale image in which the pixels of the selected image are corrected through an operation that multiplies a ratio that is obtained by dividing the largest exposure value, among the exposure values of each of the plurality of images, by the exposure value of the selected image, among the plurality of images, by each of the pixel values of the pixels that are included in the selected image. Meanwhile, such an operation may be an operation that is performed by the scaler 123 that is included in the controller 120.

For example, it is assumed that the exposure value increases from the first exposure value ET_1 to the n-th exposure value ET_n with reference to FIGS. 5A and 5B. The controller 120 may obtain first to n-th scale images SIMG_1 to SIMG_n in which first to n-th images IMG_1 to IMG_n are corrected based on the exposure values and the pixel values of each of the first to n-th images IMG_1 to IMG_n. Here, a case in which a k-th scale image SIMG_k or 520 is obtained from a k-th image IMG_k or 510 is described. The controller 120 may obtain the k-th scale image SIMG_k or 520 including pixels with a corrected pixel value 521 through an operation that multiplies a pixel value PV_K or 511 of each of pixels that are included in the k-th image IMG_k or 510 by the ratio of the exposure value. Here, the ratio of the exposure value for the k-th image IMG_k or 510 may be a value that is obtained by dividing the n-th exposure value ET_n, which is the largest exposure value, by the k-th exposure value ET_k of the k-th image IMG_k or 510. By repeating such a method, the controller 120 may obtain the first to n-th scale images SIMG_1 to SIMG_n.

According to an embodiment, the controller 120 may obtain the plurality of scale images SIMG_1 to SIMG_n that are obtained by correcting the pixel values of the pixels of each of the plurality of images IMG_1 to IMG_n, by using the exposure values ET_1 to ET_n of each of the plurality of images IMG_1 to IMG_n, and converting a color of the pixels of each of the plurality of images IMG_1 to IMG_n into a grayscale. Here, the scale images SIMG_1 to SIMG_n may be images with a grayscale color space. The grayscale may indicate a color of a single channel, such as black and white (or a gray shade). In this case, the pixel value of the pixel may indicate a brightness or an amount of light. This is specifically described with reference to FIG. 6A.

Figure 6A:
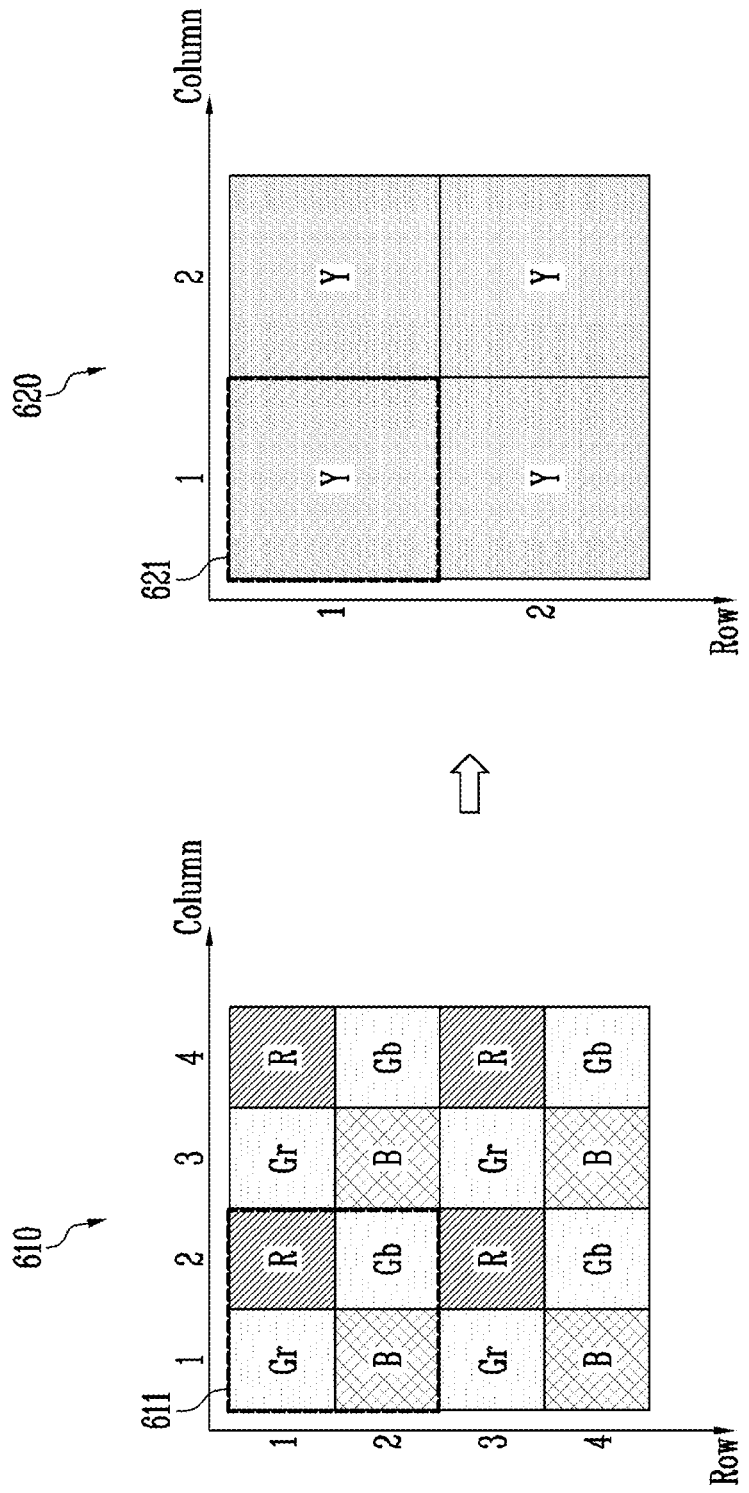
FIG. 6A is a diagram illustrating a scale image converted to a grayscale according to an embodiment of the present disclosure.

FIG. 6A is a diagram illustrating a scale image converted to a grayscale according to an embodiment of the present disclosure.

Referring to FIG. 6A, the controller 120 may obtain a plurality of scale images 620 that are obtained by converting a color of pixels of each of a plurality of images 610 into a grayscale. Here, the plurality of images 610 may include a red pixel R, green pixels Gr and Gb, and a blue pixel B. Meanwhile, such an operation may be an operation that is performed by the scaler 123 that is included in the controller 120.

Meanwhile, the plurality of images 610 may be images in which the pixel values are corrected by using the exposure values ET_1 to ET_n of each of the plurality of images IMG_1 to IMG_n that are described with reference to FIGS. 5A and 5B. That is, as described with reference to FIGS. 5A and 5B, the controller 120 may obtain the plurality of scale images by first correcting the pixel values by using the exposure values of each of the plurality of images and converting the color of the pixels that are included in each of the plurality of images into a grayscale as shown in FIG. 6A. However, this is merely an embodiment, and the controller 120 may obtain the plurality of scale images by first converting the color of the pixels that are included in each of the plurality of images into the grayscale and correcting the pixel values by using the exposure values ET_1 to ET_n of each of the plurality of images that are converted into the grayscale as shown in FIGS. 5A and 5B.

For example, the controller 120 may obtain the pixel value that is converted into the grayscale of an area 621 that corresponds to a unit sub-area 611 through a weight operation that multiplies an individual weight to the pixel values of the red pixel R, the green pixels Gr and Gb, and the blue pixel B that are included in the unit sub-area 611 of the image 610. In addition, the controller 120 may obtain the scale image 620 including luminance pixels Y with the converted pixel value. Here, the unit sub-area 611 may be an area with the red pixel R, the green pixels Gr and Gb, and the blue pixel B, one by one. At this time, the scale image 620 may be referred to as a grayscale image to distinguish the scale image 620 from the above-described scale image 520.

When the controller 120 converts the red pixel R, the green pixels Gr and Gb, and the blue pixel B that are included in the unit sub-area 611 into the grayscale, the controller 120 may calculate the luminance pixel Y of the area 621 that corresponds to the unit sub-area 611 through the following weight operation.

For example, a result of an operation of (0.257×pixel value of red pixel R)+(0.504×sum (or average) of pixel values of green pixels Gr and Gb)+(0.098×pixel value of blue pixel B)+16 may be the pixel value of the luminance pixel Y. For another example, a result of an operation of (0.299×pixel value of red pixel R)+(0.587×sum (or average) of green pixels Gr and Gb+(0.114×pixel value of blue pixel B) may be the pixel value of the luminance pixel Y. Meanwhile, the above-described examples are merely examples, and the pixel value of the luminance pixel Y may be calculated through a weight operation to which various weights are applied.

Figure 6B:
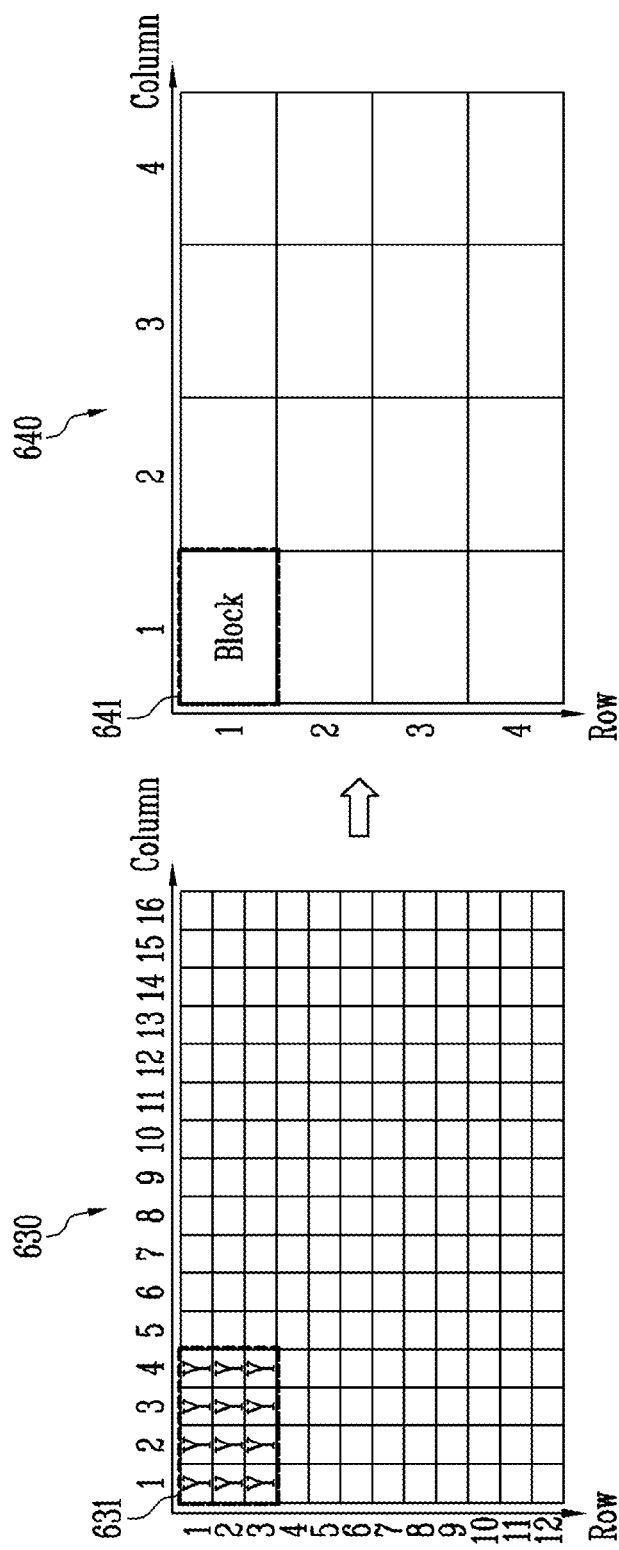
FIG. 6B is a diagram illustrating a block according to an embodiment of the present disclosure.

FIG. 6B is a diagram illustrating a block according to an embodiment of the present disclosure.

Referring to FIG. 6B, the controller 120 according to an embodiment of the present disclosure may obtain a block value of each of a plurality of areas included in a grayscale image 630. Specifically, each of the plurality of areas included in the grayscale image 630 may include pixel values of M×N luminance pixels Y. Here, any one area 631 of the plurality of areas may correspond to any one block 641. That is, the controller 120 may calculate the block value of the block 641 that corresponds to any one area 631 by using pixel values that are included in any one area 631. Here, M and N are natural numbers. For example, one block may include luminance pixels Y of 8×8, 16×16, 32×32, 64×64, or the like. The grayscale image 630 may correspond to a block image 640. The M×N luminance pixels Y that are included in the grayscale image 630 may correspond to the block 641 that is included in the block image 640.

Here, the block may include the block value. The block value may be any one of an average pixel value of the luminance pixels Y that are included in the area that corresponds to the block, or a central value of the pixel values of the luminance pixels Y.

The controller 120 may identify the object based on the block value of the block. For example, in an embodiment, the controller may identify blocks of an adjacent position with a block value within a preset value based on the block value of one block as one object. The controller 120 may determine a position of the identified object as a position of a corresponding block. Alternatively, the controller 120 may determine the position of the identified object as a position of a pixel that corresponds to the corresponding block. In addition, the controller 120 may identify the object by using various algorithms or the like such as a programming library (for example, OpenCV, Python, or the like) for analyzing real-time computer vision, various color filters such as a Sobel filter or a Fuzzy filter, Canny edge detection, color-based, template-based, or a background differentiation method. Meanwhile, the above-described embodiment is merely an embodiment, and a plurality of pixels of the image 610 may be grouped into the block without converting the image 610 of FIG. 6A into a grayscale.

Figure 7A:
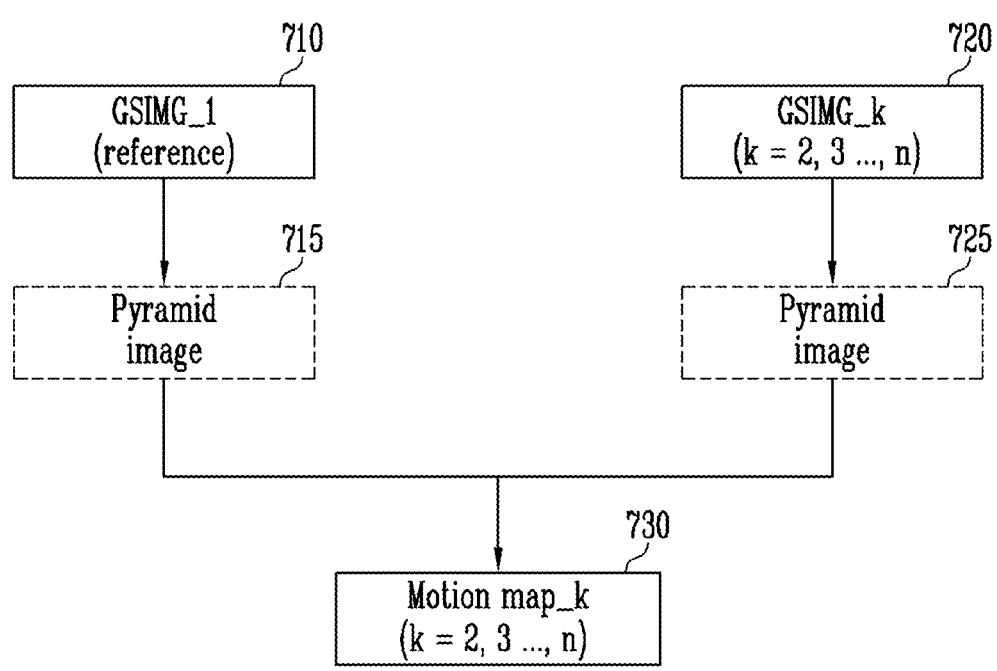
Figure 7B:
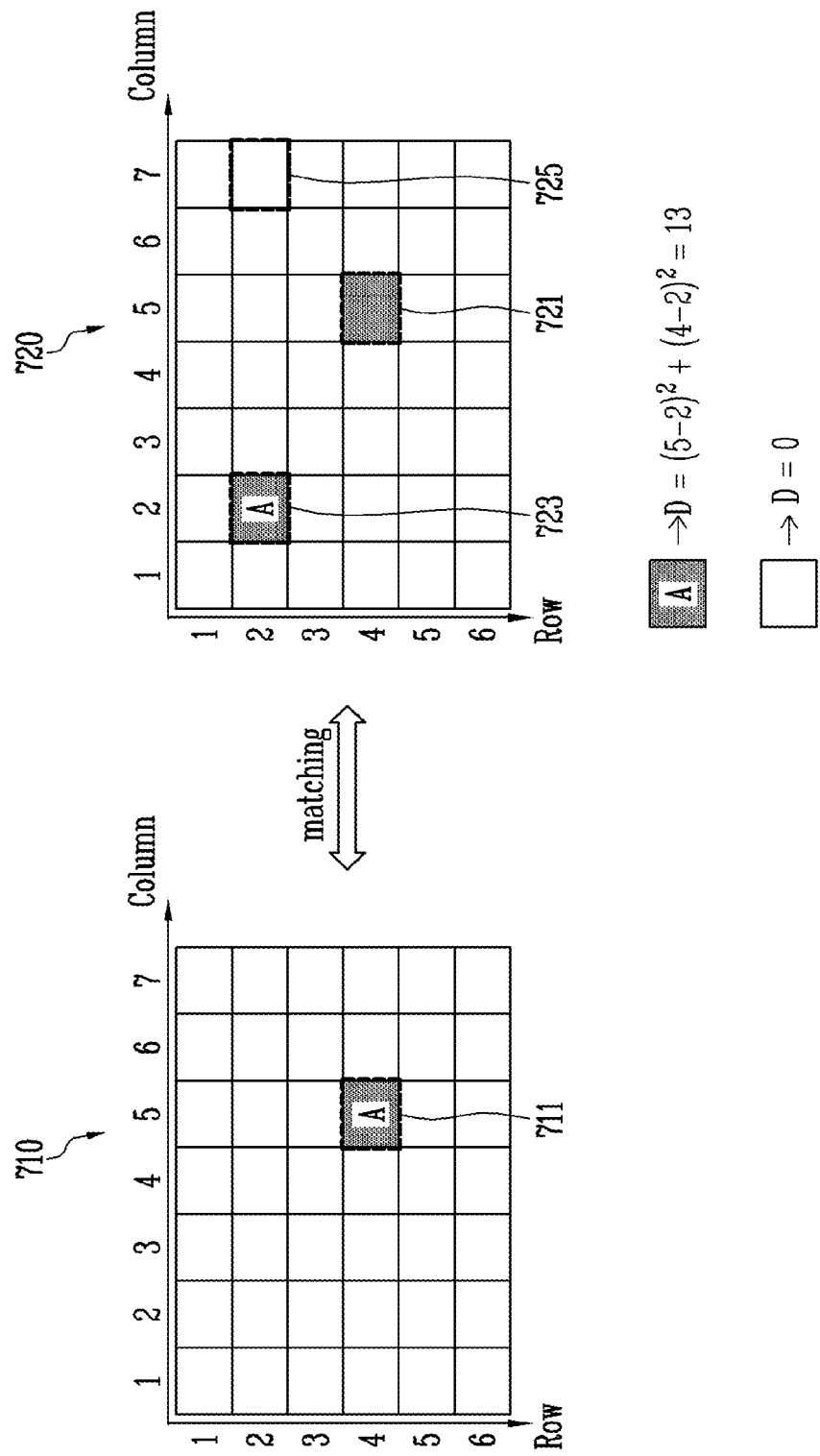

FIGS. 7A to 7C are diagrams illustrating a motion map according to an embodiment of the present disclosure.

Referring to FIG. 7A, the controller 120 may select a scale image GSIMG_1, among a plurality of scale images 710 and 720, having the smallest exposure value as a reference scale image 710. Here, the reference scale image 710 may be the scale image GSIMG_1 with the smallest exposure value, and the reference scale image 710 may be a reference image that becomes a reference for comparing the position of an object that is included in another scale images GSIMG_k.

The controller 120 may obtain a motion map 730 for each of remaining scale images 720 by comparing the remaining scale images 720, among the plurality of scale images 710 and 720, except for the reference scale image 710, with the reference scale image 710, one by one.

For example, a first scale image, among the plurality of scale images, having the smallest first exposure value may be selected as the reference scale image. A second motion map that corresponds to a second scale image may be generated by using a second scale image with a second exposure value that is greater than the first exposure value and the reference scale image. A third motion map that corresponds to a third scale image may be generated by using the third scale image with a third exposure value that is greater than the first exposure value and the reference scale image. A fourth motion map that corresponds to a fourth scale image may be generated by using the fourth scale image with a fourth exposure value that is greater than the first exposure value and the reference scale image. That is, the first motion map that corresponds to the first scale image may be omitted.

Hereinafter, for convenience of description, the remaining scale images 720 are described based on one scale image.

Here, the controller 120 may obtain the motion map 730 for the scale image 720 by comparing the position of the object that is included in the reference scale image 710 with the position of the object that is included in the scale image 720. Meanwhile, such an operation may be an operation that is performed by the motion map generator 127 that is included in the controller 120.

In an embodiment, the controller 120 may generate a reference pyramid image 715 that is obtained by reducing the reference scale image 710 to a preset resolution and may generate a pyramid image 725 that is obtained by reducing the scale image 720 with the selected exposure value to a preset resolution. Here, the reference pyramid image 715 and the pyramid image 725 may be images in which the resolutions of the reference scale image 710 and the scale image 720 are gradually reduced. Here, the resolution may indicate the number of pixels that are disposed in a row direction and the number of pixels that are disposed in a column direction.

For example, the controller 120 may obtain the reference pyramid image 715 and the pyramid image 725 that are obtained by applying a Gaussian filter to the reference scale image 710 and the scale image 720 and reducing the resolution to ½. The resolution of the image may be reduced by removing an even-numbered or odd-numbered pixel in the row direction and the column direction. Here, the reference scale image 710 and the scale image 720 may be a first level, the reference pyramid image 715 and the pyramid image 725 in which the resolution is reduced to ½ may be a second level, the reference pyramid image 715 and the pyramid image 725 in which the resolution is reduced to ¼ may be a third level, and the reference pyramid image 715 and the pyramid image 725 in which the resolution is reduced to ⅛ may be a fourth level. In such a method, the resolution of the image may be repeatedly reduced, and the level of the image may indicate a degree at which the resolution of the image is reduced.

The controller 120 may determine the positional change of the object by comparing blocks of the reference pyramid image 715 and the pyramid image 725 of the same level. The controller 120 may determine the position of the object in the reference pyramid image 715 and the pyramid image 725 of an upper level and may determine the position of the object in the reference pyramid image 715 and the pyramid image 725 of a level lower, immediately before the upper level, based on the position of the object that is determined at the upper level. By repeating such a process, the controller 120 may determine the position of the object in the reference scale image 710 and the scale image 720 for the lowest level.

For example, the controller 120 may determine the position of the identified object based on a block value of blocks that are included in each of the reference pyramid image 715 and the pyramid image 725 of the third level. In addition, the controller 120 may determine the position of the object that is identified based on the block value of the blocks, among the blocks that are included in each of the reference pyramid image 715 and the pyramid image 725 of the second level, corresponding to the position of the object that is determined at the third level. In addition, the controller 120 may determine the position of the object identified based on the block value of the blocks, among the blocks that are included in each of the reference pyramid image 710 and the pyramid image 720 of the first level, corresponding to the position of the object that is determined at the second level. As described above, after determining the position of the object at the higher level at which the resolution is small, the position of the object may be used at the lower level of which the resolution is large. Therefore, the operation amount that is required for determining the position of the object may be reduced and fast image analysis may be possible.

Referring to FIG. 7B, the controller 120 may determine a positional difference of the object by comparing the reference scale image 710 and the selection scale image 720. Here, the reference scale image 710 may be the first scale image. The selected scale image 720 may be one of the second scale image to the n-th scale image. The first scale image may be an image in which the pixel value of the pixels with the first exposure value, which is the smallest exposure value, is corrected, the second scale image may be an image in which the pixel value of the pixels with the second exposure value that is greater than the first exposure value is corrected, and the n-th scale image may be an image in which the pixel value of the pixels with the n-th exposure value that is greater than the first exposure value is corrected.

For example, it is assumed that the position of the block 711, among blocks that are included in the reference scale image 710, indicating an object A is (5, 4), and a position of a block 723, among blocks that are included in the scale image 720 is (2, 2), indicating the same object A. In this case, when the position of the object changes from (5, 4) to (2, 2) with respect to the block 723 of the position (2, 2), the controller 120 may calculate the positional difference of the object as $(5-2)^2+(4-2)^2=13$. The controller 120 may apply a value of 0 as the positional difference with respect to a block 725 in which the object does not exist, such as a block (7, 2). In addition, the controller 120 may apply the value of 13 equal to that of the block 723 of the (2, 2) position as the positional difference with respect to the block 721 of the (5, 4) position in which the object A existed, but does not currently exist. However, this is merely an example, and a value that is applied to the block 725 in which the object does not exist and the block 721 in which the object A existed but does not currently exist may be modified to an arbitrary another value.

Meanwhile, referring to FIG. 7C, the controller 120 may calculate the motion map through a value that is calculated by substituting the value that is calculated in the method that is described with reference to FIG. 7B into an equation of FIG. 7C. Here, a motion value MV_XY of a position (X, Y) of the block that is included in the motion map may be used as a weight. For example, the motion value MV_XY may have a value that belongs to a range of 0 or more and 1 or less.

In an embodiment, when a positional difference D_XY of the object at the block position (X, Y) is greater than a minimum reference value Min and is equal to or less than a maximum reference value Max, the controller 120 may increase the motion value MV_XY, among the plurality of motion values that are included in the motion map, corresponding to the position of the object as the positional difference D_XY increases.

In an embodiment, when the positional difference D_XY is equal to or less than the minimum reference value Min, the controller 120 may adjust the motion value MV_XY, among the plurality of motion values that are included in the motion map, corresponding to the position of the object to a value of 0. That is, when the positional difference D_XY is equal to or less than the minimum reference value Min, the motion value MV_XY may have the value of 0 as a minimum value.

In an embodiment, when the positional difference D_XY is greater than the maximum reference value Max, the controller 120 may adjust the motion value MV_XY, among the plurality of motion values that are included in the motion map, corresponding to the position of the object to a value of 1. That is, when the positional difference D_XY exceeds the maximum reference value Max, the motion value MV_XY may have the value of 1 as a maximum value.

Meanwhile, the controller 120 may perform noise removal processing on the calculated motion value MV_XY. For example, the controller 120 may perform a closing process after performing an opening process on the motion value MV_XY. Here, the opening process may be performing a dilation operation next to an erosion operation, and the closing process may be performing an erosion operation next to a dilation operation.

Figures 8A, 8B:
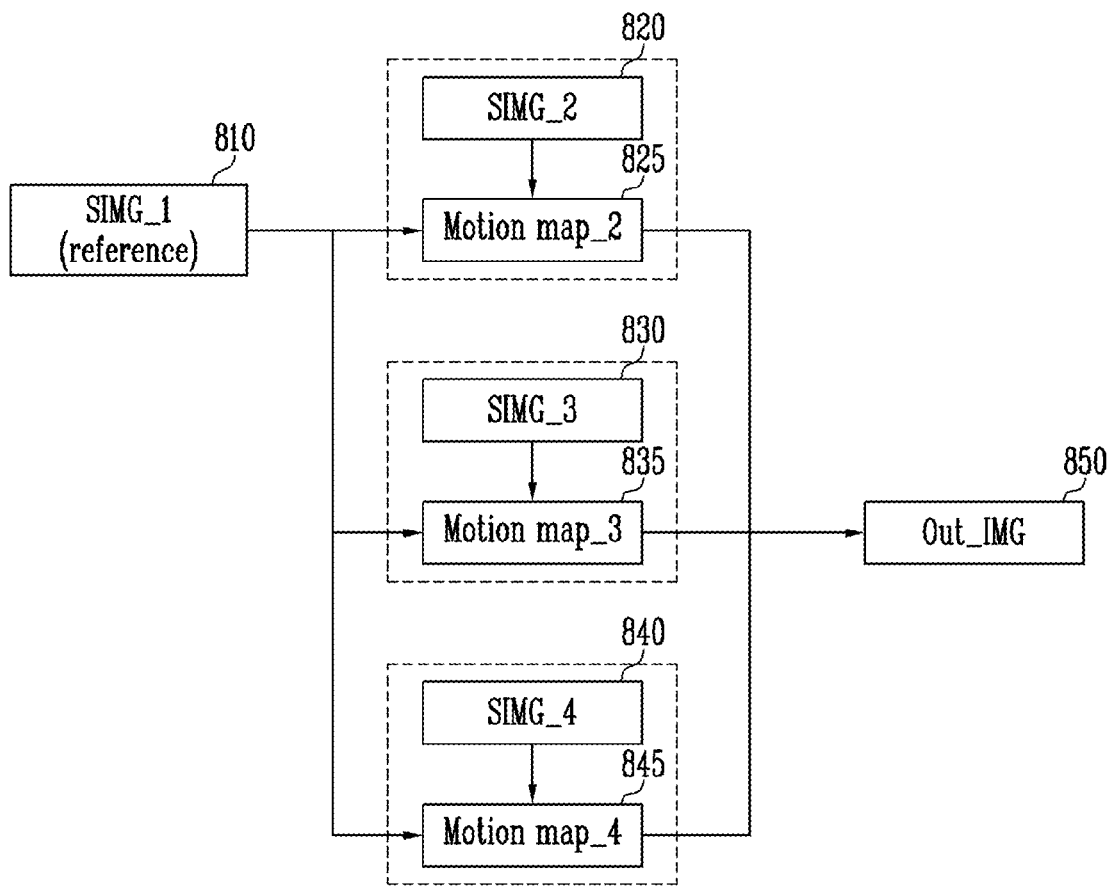

FIGS. 8A to 8C are diagrams illustrating an output image according to an embodiment of the present disclosure.

Referring to FIG. 8A, the controller 120 may select a first scale image, among the plurality of scale images SIMG_1 to SIMG_4, having the smallest exposure value as a reference scale image 810. The controller 120 may generate an output image 850 by performing an operation of a weigh operation by using motion maps 825, 835, and 845 as weights for each of the reference scale image 810 and remaining scale images 820, 830, and 840. Meanwhile, such an operation may be an operation that is performed by the image synthesizer 129 that is included in the controller 120.

The motion maps 825, 835, and 845 may be generated as a result of comparing one of the remaining scale images 820, 830, and 840 with the reference scale image 810 as described above with reference to FIGS. 7A to 7C. The reference scale image 810 and the remaining scale images 820, 830, and 840 that are used to generate the motion maps 825, 835, and 845 may be images that are converted into a grayscale.

As a specific example, the controller 120 may perform a first weight operation by using a second motion map 825 that corresponds to a second scale image 820 as a weight for the reference scale image 810 and the second scale image 820. The controller 120 may perform a second weight operation by using a third motion map 835 that corresponds to a third scale image 830 as a weight for the reference scale image 810 and the third scale image 830. The controller 120 may perform a third weight operation by using a fourth motion map 845 that corresponds to a fourth scale image 840 as a weight for the reference scale image 810 and the fourth scale image 840. The controller 120 may generate the output image 850 by an average of the first to third weight operations.

Meanwhile, the above-described embodiment assumes that the number of the plurality of scale images SIMG_1 to SIMG_4 is four. In other words, the number of exposure values with different values is four. However, the disclosure is not limited thereto, and may be variously modified and implemented according to the number of exposure values or the like.

In an embodiment, the controller 120 may generate an output image Out_Img by performing a weight operation by using a motion map Motion_map_i as a weight for each of a reference scale image SIMG_1 and a remaining scale image SIMG_i through an equation shown in FIG. 8B. Here, n may be the number of a plurality of scale images or the number of exposure values with different values.

The output image Out_Img may be an image that is synthesized through a weight operation to which a weight for the reference scale image SIMG_1 with the smallest exposure value is applied as a large value and a weight for the scale image SIMG_i is applied as a small value.

Referring to FIG. 8C, a weight calculation may be performed on a scale image 860 and a motion map 870 by using values in a positional relationship that corresponds to each other. Here, the scale image 860 may be the reference scale image or a scale image that corresponds to the motion map 870. The motion map 870 may include a motion value that is calculated based on the block that corresponds to the pixel as described above with reference to FIGS. 6A to 8C. A pixel value of a pixel that is included in the scale image 860 and the motion value that is included in the motion map 870 may be operated on values in a positional relationship that corresponds to each other. For example, when a first area 861 that is included in the scale image 860 and a first motion value 871 of the motion map 870 are in a positional relationship that corresponds to each other, an operation that multiplies the motion value 871 by the pixel value of the pixels that are included in the first area 861 may be performed.

According to the present disclosure as described above, the electronic device 100 and the method of operating the same for outputting an image with improved image quality while preventing a ghost phenomenon from occurring may be provided. In addition, the occurrence of the ghost phenomenon in an image that is obtained by synthesizing images with different exposure times may be minimized.

Figure 9:
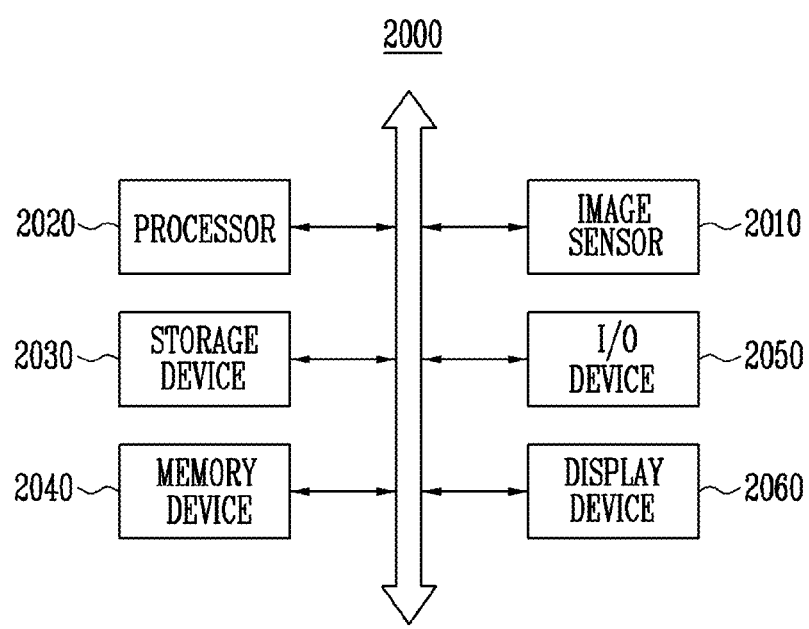
FIG. 9 is a diagram illustrating an implementation example of an electronic device according to an embodiment of the present disclosure.

FIG. 9 is a diagram illustrating an implementation example of an electronic device according to an embodiment of the present disclosure.

Referring to FIG. 9, the electronic device 100 may be implemented as a computing system 2000. The computing system 2000 may include an image sensor 2010, a processor 2020, a storage device 2030, a memory device 2040, an input/output device 2050, and a display device 2060. Although not shown in FIG. 9, the computing system 2000 may further include a port capable of communicating with the storage device 2030, the memory device 2040, the input/output device 2050 and the display device 2060 or capable of communicating with an external device.

The image sensor 2010 may obtain an image with a plurality of pixels to which an exposure value is individually applied. The image sensor 2010 may be connected to and communicate with the processor 2020 through an address bus, a control bus, a data bus, or another communication link.

The image sensor 2010 may be implemented in various types of packages. For example, at least some configurations of the image sensor 2010 may be implemented using packages, such as a package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), system in package (SIP), multi-chip package (MCP), wafer-level fabricated package (WFP), wafer-level processed stack package (WSP), and the like. According to an embodiment, the image sensor 2010 may be integrated in one chip together with the processor 2020, or the image sensor 2010 and the processor 2020 may be integrated in different chips, respectively.

The processor 2020 may control an overall operation of the computing system 2000. The processor 2020 may control the display device 2060 to display the output image. The processor 2020 may store the output image in the storage device 2030.

The processor 2020 may perform specific calculations or tasks. According to an embodiment of the present disclosure, the processor 2020 may include at least one of a central processing unit (CPU), an application processing unit (APU), a graphic processing unit (GPU), and the like.

The processor 2020 may be connected to the storage device 2030, the memory device 2040, and the input/output device 2050 through an address bus, a control bus, and a data bus to perform communication. According to an embodiment of the present disclosure, the processor 2020 may also be connected to an expansion bus, such as a peripheral component interconnect (PCI) bus.

The processor 2020 may obtain the scale image according to the exposure value of the image. The processor 2020 may select the scale image with the smallest exposure value as the reference scale image and compare the reference scale image and the scale image with another exposure value to generate the motion map. The processor 2020 may generate the output image through the weight operation using the motion map as the weight for the reference scale image and the scale image with the other exposure value.

The storage device 2030 may store data such as the output image. Here, the data stored in the storage device 2030 may be preserved not only in a case in which the computing system 2000 is driven but also in a case in which the computing system 2000 is not driven. For example, the storage device 2030 may be configured as one of all types of nonvolatile memories such as a flash memory device, a solid state drive (SSD), a hard disk drive (HDD), and an optical disk.

The memory device 2040 may store data such as the output image. The memory device 2040 may temporarily store data to be processed by the processor 2020 or temporarily store data processed by the processor 2020. Here, the data stored in the memory device 2040 may be preserved only in a case in which the computing system 2000 is driven. Alternatively, the data stored in the memory device 2040 may be preserved even in a case in which the computing system 2000 is driven or is not driven. For example, the memory device 2040 may include a volatile memory device such as a dynamic random access memory (DRAM) and a static random access memory (SRAM), and a nonvolatile memory device such as an erasable programmable read-only memory (EPROM), an electrically erasable programmable read-only memory (EEPROM), and a flash memory device.

The input/output device 2050 may include an input device and an output device. The input device may be a device that is capable of inputting a user's command through interaction, and for example, the input device may be implemented as a keyboard, a keypad, a mouse, a microphone, or the like. The output device may be a device that is capable of outputting data, and for example, the output device may be implemented as a printer, a speaker, or the like.

The display device 2060 is a device that visually outputs data, such as the output image. To this end, the display device 2060 may be implemented as various types of displays, such as a liquid crystal display, which uses a separate backlight unit (for example, a light emitting diode (LED) or the like) as a light source and controls a degree (brightness of light or intensity of light) at which light that is emitted from the backlight unit transmits through a liquid crystal by controlling a molecular arrangement of the liquid crystal, and a display by using a self-luminous element (for example, a mini LED of which a size is 100-200 μm, a micro LED of which a size is 100 μm or less, an organic LED (OLED), a quantum dot LED (QLED), or the like) without a separate backlight unit or a liquid crystal as a light source. In this case, the display device 2060 may emit light of red, green, and blue colors that correspond to the output image to the outside.

What is claimed is:

1. An electronic device comprising:
   an image sensor including a plurality of pixel groups respectively corresponding to a plurality of exposure values; and
   a controller configured to:
   select a reference scale image having a minimum exposure value and a target scale image having an exposure value different from the minimum exposure value, among a plurality of scale images that are obtained based on the plurality of pixel groups, and
   output an output image obtained using a motion map indicating a positional change of an object that is commonly included in the reference scale image and the target scale image,
   wherein the controller comprises a motion value calculator configured to obtain the motion map that includes a motion value that is calculated based on a distance between a first area included in the reference scale image and a second area included in the target scale image, each of the first area and the second area indicates the object, and
   wherein the motion value calculator calculates a value that is proportional to the distance as the motion value when the distance exceeds a minimum reference value and is equal to or less than a maximum reference value.

2. The electronic device of claim 1, wherein the controller is configured to output the output image using the motion map as a weight for the reference scale image and the target scale image.

3. The electronic device of claim 1, wherein the controller comprises:
   an image extractor configured to obtain a plurality of images based on an exposure value of each of the plurality of pixel groups; and
   a scaler configured to obtain the plurality of scale images that are obtained by correcting the plurality of images by using a ratio of a maximum exposure value, among the plurality of exposure values, and the exposure value of each of the plurality of images.

4. The electronic device of claim 1, wherein the controller comprises
   a block distance calculator configured to obtain the distance between the first area, among a plurality of first areas that are included in the reference scale image, and the second area, among a plurality of second areas that are included in the target scale image.

5. The electronic device of claim 4,
   wherein, when the distance is equal to or less than the minimum reference value, the motion value calculator calculates a value of 0 as the motion value, and
   wherein, when the distance exceeds the maximum reference value, the motion value calculator calculates a value of 1 as the motion value.

6. The electronic device of claim 4, wherein the controller comprises an image synthesizer configured to generate the output image according to a weight operation that increases a weight for pixel values, among pixel values that are included in the reference scale image, corresponding to the motion value, and decreases a weight for pixel values, among pixel values that are included in the target scale image as the motion value increases, corresponding to the motion value.

7. The electronic device of claim 4, wherein the controller comprises a block value calculator configured to:
   obtain an average value or a median value of pixel values that are included in each of the plurality of first areas that are included in the reference scale image as a block value of each of the plurality of first areas, and
   obtain an average value or a median value of pixel values that are included in each of the plurality of second areas that are included in the target scale image as a block value of each of the plurality of second areas.

8. The electronic device of claim 7, wherein the controller comprises a block position detector configured to:
   determine a first selection area as the first area, among the plurality of first areas, indicating the object when a difference between a block value of the first selection area and block values of first peripheral areas that are positioned within a preset distance from the first selection area exceeds a reference value, and determine a second selection area as the second area, among the plurality of second areas, indicating the object when a difference between a block value of the second selection area and block values of second peripheral areas that are positioned within a preset distance from the second selection area exceeds the reference value.

9. The electronic device of claim 4, wherein the controller comprises:

a pyramid image generator configured to obtain a reference pyramid image that is obtained by decreasing a resolution of the reference scale image and a selection pyramid image that is obtained by decreasing a resolution of the target scale image; and a block position detector configured to:

determine a first pyramid area, among a plurality of first pyramid areas that are included in the reference pyramid image, indicating the object, and a second pyramid area, among a plurality of second pyramid areas that are included in the selection pyramid image, indicating the object, and determine an area, among the plurality of first areas, corresponding to the first pyramid area, as the first area and determine an area, among the plurality of second areas, corresponding to the second pyramid area, as the second area.

10. The electronic device of claim 1, wherein the controller comprises a grayscale converter configured to obtain a plurality of grayscale images that are obtained by converting a pixel value for a red color, a pixel value for a green color, and a pixel value for a blue color that are included in each of the plurality of scale images into a pixel value for a grayscale.

11. The electronic device of claim 10, wherein the controller comprises:

a block distance calculator configured to obtain a distance between a first area, among a plurality of first areas that are included in a reference grayscale image, among the plurality of grayscale images, having a minimum exposure value, indicating the object, and a second area, among a plurality of second areas that are included in a selection grayscale image, indicating the object; and a motion value calculator configured to obtain the motion map including a motion value that is calculated based on the distance.

12. A method of operating an electronic device, the method comprising:

obtaining a plurality of images from a plurality of pixel groups that sense pixel values during different exposure times;

obtaining a plurality of scale images that are obtained by correcting the plurality of images by using an exposure time of each of the plurality of images;

generating a motion map that indicates a positional change of an object, based on a reference scale image, among the plurality of scale images, having a minimum exposure time and a selection scale image with an exposure time that is different from the minimum exposure time; and outputting an output image that is synthesized by using the motion map as a weight for the reference scale image and the selection scale image, wherein the object is commonly included in the reference scale image and the selection scale image, wherein generating the motion map comprises calculating a value that is proportional to the positional change as a motion value when the positional change exceeds a minimum reference value and is equal to or less than a maximum reference value, and wherein the motion map includes the motion value.

13. The method of claim 12, wherein obtaining the plurality of scale images comprises obtaining a plurality of scale images that are obtained by correcting the plurality of images by using a ratio of a maximum exposure time, among the exposure times of each of the plurality of images, and the exposure time of each of the plurality of images.

14. The method of claim 12, wherein obtaining the plurality of scale images comprises:

obtaining a plurality of corrected images that are obtained by correcting the plurality of images by using the exposure time of each of the plurality of images; and obtaining the plurality of scale images that are obtained by converting the corrected images into grayscale.

15. The method of claim 12, wherein generating the motion map comprises calculating a value of 0 as the motion value when the positional change is equal to or less than the minimum reference value.

16. The method of claim 12, wherein generating the motion map comprises calculating a value of 1 as the motion value when the positional change exceeds the maximum reference value.

17. The method of claim 12, wherein generating the motion map comprises:

obtaining a reference pyramid image that is obtained by decreasing a resolution of the reference scale image and a selection pyramid image that is obtained by decreasing a resolution of the selection scale image;

determining a first pyramid area, among a plurality of first pyramid areas that are included in the reference pyramid image, indicating the object and a second pyramid area, among a plurality of second pyramid areas that are included in the selection pyramid image, indicating the object; and determining a positional difference between an area, among a plurality of first areas that are included in the reference scale image, corresponding to the first pyramid area and an area, among a plurality of second areas that are included in the selection scale image, corresponding to the second pyramid area as the positional change.

18. The method of claim 12, wherein obtaining the plurality of images comprises:

obtaining a first image with pixel values that are sensed during a first exposure time from a first pixel group that is included in the plurality of pixel groups; and obtaining a second image with pixel values that are sensed during a second exposure time including the first exposure time from a second pixel group that is included in the plurality of pixel groups.

* * * * *